United States Patent
Kawamoto

(10) Patent No.: US 11,066,539 B2
(45) Date of Patent: *Jul. 20, 2021

(54) RUBBER COMPOSITION

(71) Applicant: KAO CORPORATION, Tokyo (JP)

(72) Inventor: Koichi Kawamoto, Sumida-ku (JP)

(73) Assignee: KAO CORPORATION, Tokyo (JP)

( * ) Notice: Subject to any disclaimer, the term of this patent is extended or adjusted under 35 U.S.C. 154(b) by 103 days.

This patent is subject to a terminal disclaimer.

(21) Appl. No.: 16/344,550

(22) PCT Filed: Oct. 25, 2017

(86) PCT No.: PCT/JP2017/038497
§ 371 (c)(1),
(2) Date: Apr. 24, 2019

(87) PCT Pub. No.: WO2018/079594
PCT Pub. Date: Mar. 5, 2018

(65) Prior Publication Data
US 2020/0048438 A1   Feb. 13, 2020

(30) Foreign Application Priority Data

Oct. 26, 2016   (JP) .............................. JP2016-209495

(51) Int. Cl.
| | | |
|---|---|---|
| *C08L 9/06* | (2006.01) |
| *A43B 1/10* | (2006.01) |
| *C08L 97/00* | (2006.01) |
| *A43B 13/04* | (2006.01) |
| *C08K 3/00* | (2018.01) |
| *C08L 7/00* | (2006.01) |

(52) U.S. Cl.
CPC ......... *C08L 9/06* (2013.01); *A43B 1/10* (2013.01); *A43B 13/04* (2013.01); *C08K 3/00* (2013.01); *C08L 7/00* (2013.01); *C08L 97/00* (2013.01); *C08L 97/005* (2013.01); *C08L 2201/08* (2013.01)

(58) Field of Classification Search
CPC . A43B 13/04; A43B 1/10; C08L 97/00; C08L 9/06; C08L 97/005; C08L 7/00; C08L 2201/08; C08K 3/00
See application file for complete search history.

(56) References Cited

U.S. PATENT DOCUMENTS

| | | | | |
|---|---|---|---|---|
| 10,717,852 B2* | 7/2020 | Kawamoto | ............ | B60C 1/0016 |
| 2009/0099281 A1* | 4/2009 | Sakurai | ................ | B60C 1/0016 |
| | | | | 524/76 |
| 2009/0239965 A1 | 9/2009 | Wada et al. | | |
| 2010/0130660 A1* | 5/2010 | Knobloch | .............. | C08K 5/103 |
| | | | | 524/289 |
| 2012/0302664 A1 | 11/2012 | Kamada | | |
| 2015/0041083 A1* | 2/2015 | Yoshikawa | ............ | D21H 17/06 |
| | | | | 162/19 |
| 2015/0329704 A1* | 11/2015 | Miyazaki | ................ | C08K 3/36 |
| | | | | 524/492 |

FOREIGN PATENT DOCUMENTS

| | | |
|---|---|---|
| EP | 3 059 274 A1 | 8/2016 |
| JP | 10-17717 A | 1/1998 |
| JP | 2005-58646 A | 3/2005 |
| JP | 2008-188220 A | 8/2008 |
| JP | 2008-194187 A | 8/2008 |
| JP | 2012-219241 A | 11/2012 |
| JP | 2012-241158 A | 12/2012 |
| JP | 2015-6998 A | 1/2015 |
| JP | 2016-60750 A | 4/2016 |
| WO | WO 2008/013060 A1 | 1/2008 |
| WO | WO 2015/056758 A1 | 4/2015 |
| WO | WO 2016/171275 A1 | 10/2016 |

OTHER PUBLICATIONS

International Search Report, issued in PCT/JP2017/038497, dated Jan. 23, 2018.

* cited by examiner

*Primary Examiner* — Angela C Scott
(74) *Attorney, Agent, or Firm* — Birch, Stewart, Kolasch & Birch, LLP

(57) ABSTRACT

The present invention relates to [1] a rubber composition exhibiting excellent grip force, which contains (A) a rubber component, (B) a lignin degradation product having an aldehyde yield, according to an alkaline nitrobenzene oxidation method, of 12% by mass or more, and (C) an anti-aging agent; [2] a shoe sole using the rubber composition of the above [1]; and [3] a grip force improving agent for rubber compositions, containing (B) a lignin degradation product having an aldehyde yield, according to an alkaline nitrobenzene oxidation method, of 12% by mass or more, as an active ingredient.

15 Claims, No Drawings

RUBBER COMPOSITION

FIELD OF THE INVENTION

The present invention relates to a rubber composition, a shoe sole using the rubber composition, and a grip force improving agent for rubber compositions.

BACKGROUND OF THE INVENTION

While rubber compositions are widely used for industrial applications, a use condition of molded articles using a rubber composition is becoming much severer, and development of a high-performance rubber material is a pressing need.

For example, for shoe soles, a rubber composition blended with a filler such as silica or carbon black for enhancing the strength, the abrasion resistance and the grip force thereof is widely used.

One important characteristic of a shoe sole is slip resistance. On a dry ground, patterns provided in outsoles of shoes can attain slip prevention, but on a wet road surface, provision of mere grooves or irregularity in outsoles is limitative for slip prevention. Accordingly, toward improvement of grip force, development of shoe sole materials themselves is now under way.

JP 10-17717 A (PTL 1) discloses a shoe outsole formed of a vulcanized molded article of a rubber composition, in which the substrate rubber material is formed of a mixture of a solution-polymerized SBR and a butadiene rubber, which contains silica hydrate and in which a vulcanized product of SBR has a specific tan δ value.

JP 2005-58646 A (PTL 2) discloses a shoe sole formed of a rubber composition containing, in the substrate rubber material thereof, an isobutylene rubber, a butadiene rubber and a filler having a specific gravity of 1.0 or more.

JP 2008-194187 A (PTL 3) discloses shoes provided with an outsole formed by crosslinking a rubber composition containing a substrate rubber material and a filler, and an upper, in which the filler has 2 or more needle-like parts.

SUMMARY OF THE INVENTION

The present invention relates to a rubber composition containing (A) a rubber component, (B) a lignin degradation product having an aldehyde yield, according to an alkaline nitrobenzene oxidation method, of 12% by mass of more, and (C) an anti-aging agent.

DETAILED DESCRIPTION OF THE INVENTION

According to the conventional technologies of PTLs 1 to 3, the grip force (slip resistance) against road surfaces, manholes and so on wet with rain is insufficient and persons may fall down during walking.

In such a current situation, a technology capable of improving the grip force against dry road surfaces or wet road surfaces by mere blending in a rubber composition in preparation for performance improvement of a rubber substrate material itself has become desired.

The present invention relates to a rubber composition exhibiting excellent grip force, a shoe sole using the rubber composition, and a grip force improving agent (anti-slip performance improving agent) for rubber compositions.

The present inventors have found that, by blending a specific lignin degradation product and an anti-aging agent in rubber, the grip force of the resultant rubber composition can be improved.

Specifically, the present invention relates to the following [1] to [3].

[1] A rubber composition containing (A) a rubber component, (B) a lignin degradation product having an aldehyde yield, according to an alkaline nitrobenzene oxidation method, of 12% by mass or more, and (C) an anti-aging agent.

[2] A shoe sole, which is produced by using the rubber composition of the above [1].

[3] A grip force improving agent for rubber compositions, containing (B) a lignin degradation product having an aldehyde yield, according to an alkaline nitrobenzene oxidation method, of 12% by mass or more, as an active ingredient.

According to the present invention, there can be provided a rubber composition exhibiting excellent grip force, a shoe sole using the rubber composition, and a grip force improving agent for rubber compositions.

[Rubber Composition]

The rubber composition of the present invention contains (A) a rubber component, (B) a lignin degradation product having an aldehyde yield, according to an alkaline nitrobenzene oxidation method, of 12% by mass or more, and (C) an anti-aging agent.

Here, the lignin degradation product (B) is, from the viewpoint of increasing the grip performance of the rubber composition, one having an aldehyde yield, according to an alkaline nitrobenzene oxidation method, of 12% by mass or more, and this is an active ingredient in the composition.

Natural lignin forms a macromolecule through enzymatic reaction bonding of three kinds of monolignols as monomers. The main bonding in the natural lignin is a β-O-4 bond, and in a process of extracting lignin from a plant-based biomass, degradation of the β-O-4 bonding and various condensation reactions between functional groups in lignin proceed to change the bonding composition in the lignin degradation product. The degree of structural change in the extracted lignin degradation product may be expressed based on the aldehyde yield according to an alkaline nitrobenzene oxidation method.

The alkaline nitrobenzene oxidation method is a method of degrading the β-O-4 bond in natural lignin and a lignin degradation product to quantitatively determine the amount of the β-O-4 bond from the resultant aldehyde monomer. Namely, a higher aldehyde yield in the alkaline nitrobenzene oxidation method means a lower degree of the denaturation.

In the present invention, "lignin degradation product" is one obtained from natural lignin without any excessive cleavage of the β-O-4 bond in natural lignin, and means a low-molecular weight one having a low degree of denaturation and having a weight average molecular weight of 500 or more and 15,000 or less.

The lignin degradation product (B) having a specific aldehyde yield for use in the present invention, from the viewpoint of obtaining a lignin having a low degree of denaturation from a plant-based biomass through treatment under a mild condition, may be obtained from a plant-based biomass by controlling the degradation and extraction condition, for example, according to the method A or the method B to be mentioned below.

Though not necessarily clear, the reason why the rubber composition of the present invention can have excellent grip performance, may be considered to be as follows.

A lignin degradation product having a lower degree of denaturation has a larger content of hydrophilic functional groups such as an aliphatic OH group and a phenolic OH group, and is therefore considered to be able to exhibit a higher affinity between the surfaces of siliceous pavement and metal products such as manhole.

A factor that governs the grip force (anti-slip force) of rubber is said to include the cohesiveness to the ground plane (road surface) and the hysteresis loss (energy loss) owing to rubber deformation. When a lignin degradation product having a low degree of denaturation is blended in a rubber composition, the cohesiveness of the composition may increase to various road surfaces owing to the hydrophilic functional groups in the lignin degradation product existing in the rubber composition. As a result, the rubber composition is considered to be able to have an improved grip force.

Regarding the grip force of a rubber composition, the slipperiness may be evaluated as the maximum static frictional force index of the composition, and the slip may be evaluated as the average kinematic frictional force index thereof.

<Rubber Component (A)>

As the rubber component (A), one or more selected from natural rubber and dienic synthetic rubber may be used from the viewpoint of abrasion resistance.

Natural rubber for use herein may be denatured one, and denatured natural rubber includes epoxidated natural rubber and hydrogenated natural rubber.

Dienic synthetic rubber includes polyisoprene rubber (IR), polybutadiene rubber (BP), styrene-butadiene rubber (SBR), acrylonitrile-butadiene rubber (NBR), chloroprene rubber (CR), butyl rubber (IIR), acrylic rubber, epichlorohydrin rubber, fluororubber, silicone rubber, ethylene-propylene rubber, urethane rubber and so on.

Among these, from the viewpoint of increasing the grip force of the rubber composition, natural rubber, denatured natural rubber, and one or more dienic synthetic rubbers selected from polyisoprene rubber (IR), polybutadiene rubber (BR), and styrene-butadiene copolymer rubber (SBR) are preferred, and styrene-butadiene copolymer rubber (SBR) is more preferred.

One alone of the rubber component (A) may be used, or two or more kinds thereof may be used in combination.

<Lignin Degradation Product (B)>

The lignin degradation product (B) having an aldehyde yield, according to an alkaline nitrobenzene oxidation method, of 12% by mass or more that is used in the rubber composition of the present invention (hereinafter this may be simply referred to as "lignin degradation product") has a low degree of degradation. The degree of degradation of the lignin decomposition product (B) can be evaluated by the aldehyde yield according to an alkaline nitrobenzene oxidation method.

The aldehyde yield according to an alkaline nitrobenzene oxidation method is, from the viewpoint of improving the grip force of the rubber composition, preferably 15% by mass or more, more preferably 18% by mass or more, even more preferably 20% by mass or more, still more preferably 22% by mass or more, and even yet still more preferably 24% by mass or more, and from the viewpoint of productivity, the aldehyde yield is preferably 60% by mass or less, more preferably 50% by mass or less, even more preferably 40% by mass or less, and still more preferably 35% by mass or less.

The aldehyde yield according to an alkaline nitrobenzene oxidation method can be specified according to the method described in the section of Examples. A lignin degradation product having a higher aldehyde yield is more highly reactive and is considered to have a higher rubber modifying effect.

The weight average molecular weight of the lignin degradation product (B) is, from the viewpoint of improving the grip force of the rubber composition, preferably 500 or more, more preferably 1,000 or more, still more preferably 1,200 or more, and yet still more preferably 1,500 or more, and is preferably 15,000 or less, more preferably 12,000 or less, still more preferably 10,000 or less, yet still more preferably 8,000 or less, even yet still more preferably 5,000 or less, even still more preferably 4,000 or less, and even yet still more further preferably 3,000 or less.

The weight average molecular weight of the lignin degradation product (B) can be measured according to the method described in the section of Examples.

The sulfur content in the lignin degradation product (B) is, from the viewpoint of reactivity with rubber, preferably 1% by mass or less, more preferably 0.8% by mass or less, and still more preferably 0.5% by mass or less, and from the viewpoint of economic potential, the sulfur content is preferably 0.001% by mass or more, more preferably 0.005% by mass or more, even more preferably 0.01% by mass or more, and still more preferably 0.02% by mass or more.

The sulfur content in the lignin degradation product (B) can be measured according to the method described in the section of Examples.

In the case where the rubber composition contains an inorganic filler, the lignin degradation product (B) acts also to enhance the adhesiveness between the inorganic filler and the rubber component (A) in the rubber composition.

[Production of Lignin Degradation Product (B)]

The lignin degradation product (B) for use in the present invention can be more efficiently produced according to the following method A or method B.

Method A:

A method including the following steps (A-1) and (A-2), and optionally further including the following step (A-3).

Step (A-1): A step of subjecting a plant-based biomass to mixing treatment with 8 parts by mass or more and 70 parts by mass or less of a basic compound and 10 parts by mass or more and 10,000 parts by mass or less of water based on 100 parts by mass of the solid component of the plant-based biomass under a condition having an H-factor of 5,000 or less to obtain a reaction product.

Step (A-2): A step of separating a lignin degradation product having an aldehyde yield of 12% by mass or more as a water-soluble component, from the plant-based biomass processed in the previous step (A-1).

Step (A-3): A step of obtaining or fractionating a product having a specific molecular weight from the lignin degradation product of a water-soluble component obtained in the previous step (A-2).

Method B:

A method including the following steps (B-1) to (B-3).

Step (B-1); A step of subjecting a plant-based biomass to an enzymatic saccharification treatment to obtain a saccharification residue.

Step (B-2); A step of subjecting the saccharification residue obtained in the step (B-1) to a heat treatment in a solvent containing at least one selected from water and organic solvents having a solubility in water at 20° C. of 90 g/L or more, to obtain a heat treatment solution containing a lignin degradation product.

Step (B-3); A step of subjecting the heat treatment solution obtained in the step (B-2) to solid-liquid separation to remove insoluble components, thereby obtaining the lignin degradation product.

<Plant-Based Biomass>

The plant-based biomass to be used as a raw material in the method A and the method B includes a herbaceous biomass and a woody biomass. Of these, a herbaceous biomass is preferred.

The herbaceous biomass means a plant raw material growing on the grassland, exclusive of trees, or a non-woody plant part. Specifically, examples thereof include gramineous, malvaceous, and leguminous plant raw materials; and non-woody raw materials of palmaceous plants.

The gramineous plant raw material includes bagasses, such as sugar cane bagasse, and sorghum bagasse; switchgrass, elephant grass, corn stover, corn cob, rice straw, wheat straw, barley, Japanese pampas grass, lawn, Johnson grass, *Erianthus arundinaceus*, and napier grass.

The malvaceous plant raw material includes kenaf, cotton and so on. The leguminous plant raw material includes alfalfa and so on. The non-woody raw material of palmaceous plant includes palm hollow bunch and so on. Among those, from the viewpoints of productivity and handling property, gramineous plant raw materials are preferred; sugar cane bagasse, corn cob, or rice straw is more preferred; sugar cane bagasse is still more preferred.

The woody biomass includes various timbers, such as various wood chips obtained from conifers, e.g., Japanese larch, and Japanese cedar, or broadleaf trees, e.g., oil palm, and Japanese cypress; and wood pulps obtained from these timbers.

These plant-based biomasses may be used alone or in combination of two or more thereof.

Though the plant-based biomass may be used without being subjected to a milling treatment, from the viewpoint of treatment efficiency, the plant-based biomass is preferably subjected to a milling treatment especially in the case of the method B to be mentioned below.

A milling device to be used is not particularly limited, and examples thereof include roll mills, such as a high-pressure compression roll mill, and a rotating roll mill; vertical roller mills, such as a ring roller mill, a roller-race mill, and a ball-race mill; tank-drive medium mills, such as a tumbling ball mill, a vibration ball mill, a vibration rod mill, a vibration tube mill, a planetary ball mill, and a centrifugal fluid mill; medium agitating mills, such as a tower-type mill, an agitating tank mill, a flow tank mill, and an annular mill; consolidated shear mills, such as a high-speed centrifugal roller mill, and an Angmill; a mortar; a stone grist mill; a Masscolloider; a fret mill; an edge runner mill; a knife mill; a pin mill; and a cutter mill.

Among those, from the viewpoints of milling efficiency of a plant-based biomass and productivity, tank-drive medium mills or medium agitating mills are preferred; tank-drive medium mills are more preferred; vibration mills, such as a vibration ball mill, a vibration rod mill, and a vibration tube mill, are still more preferred; and a vibration rod mill is yet still more preferred.

The milling method may be conducted in either a batch-wise or continuous manner.

The material of the medium to be used for milling is not particularly limited, and examples thereof include iron, stainless steel, alumina, zirconia, silicon carbide, silicon nitride, glass and so on. From the viewpoint of milling efficiency of plant-based biomass, iron, stainless steel, zirconia, silicon carbide, or silicon nitride is preferred; and from the viewpoint of industrial use, iron or stainless steel is more preferred.

From the viewpoint of milling efficiency of the plant-based biomass, it is preferred that the apparatus to be used is a vibration mill, and the medium is a rod or a ball.

In the case where the medium is a rod, from the viewpoint of efficient milling, an outer diameter of the rod is preferably 5 mm or more, more preferably 10 mm or more, and still more preferably 20 mm or more; and it is preferably 100 mm or less, more preferably 50 mm or less, and still more preferably 40 mm or less.

In the case where the medium is a ball, from the viewpoint of efficient milling, an outer diameter of the ball is preferably 0.1 mm or more, and more preferably 1 mm or more; and it is preferably 100 mm or less, and more preferably 50 mm or less.

Though the filling rate of the medium varies depending upon the type of the vibration mill, it is generally 10% by volume or more, preferably 30% by volume or more, and more preferably 50% by volume or more; and preferably 95% by volume or less, more preferably 90% by volume or less, and still more preferably 70% by volume or less. The filling rate as referred to herein means a volume of the medium relative to the volume of the tank of an agitating part of the vibration mill.

Though a milling time varies depending upon the milling device to be used and the quantity of energy to be used, from the viewpoint of microfabrication of the plant-based biomass, it is generally 5 minutes or more, and preferably 10 minutes or more, and from the viewpoints of microfabrication of the plant-based biomass and economy, it is generally 12 hours or less, preferably 3 hours or less, and more preferably one hour or less.

The method A does not always require the milling treatment.

[Method A]
[Step (A-1)]

The step (A-1) is a step of subjecting a plant-based biomass to mixing treatment with 8 parts by mass or more and 70 parts by mass or less of a basic compound and 10 parts by mass or more and 10,000 parts by mass or less of water based on 100 parts by mass of a solid component of the plant-based biomass under the condition where an H-factor is 5,000 or less to obtain a reaction product.

(Basic Compound)

The basic compound includes one or more selected from an alkali metal hydroxide, such as sodium hydroxide, potassium hydroxide, and lithium hydroxide; an alkaline earth metal hydroxide, such as magnesium hydroxide, and calcium hydroxide; an alkali metal oxide, such as sodium oxide, and potassium oxide; an alkaline earth metal oxide, such as magnesium oxide, and calcium oxide; an alkali metal sulfide, such as sodium sulfide, and potassium sulfide; an alkaline earth metal sulfide, such as magnesium sulfide, and calcium sulfide; a quaternary ammonium hydroxide, such as tetramethyl ammonium hydroxide, tetrabutyl ammonium hydroxide. Among those, from the viewpoint of increasing the collection rate of the lignin degradation product (B), the basic compound is preferably an alkali metal hydroxide or an alkaline earth metal hydroxide, more preferably an alkali metal hydroxide, and still more preferably sodium hydroxide or potassium hydroxide. From the viewpoint of increasing the collection rate of the lignin degradation product and the viewpoint of workability, the basic compound is preferably sodium hydroxide. One alone of these basic compounds may be used, or two or more kinds thereof may be used in combination.

From the viewpoint of increasing the collection rate of the lignin degradation product (B), the amount of the basic compound in the step (A-1) is preferably 70 parts by mass or less, more preferably 60 parts by mass or less, still more preferably 55 parts by mass or less, yet still more preferably 50 parts by mass or less, even yet still more preferably 40 parts by mass or less, even still more preferably 30 parts by mass or less, and even still more further preferably 20 parts by mass or less, and preferably 8 parts by mass or more, and more preferably 10 parts by mass or more, based on 100 parts by mass of the solid component of the plant-based biomass.

(Water)

Water to be used is not specifically limited, and any of distilled water, ion-exchanged water and pure water may be used.

From the viewpoint of increasing the collection rate of the lignin degradation product (B) and the viewpoint of workability, such as uniform stirring and mixing and from the viewpoint of economy, the amount of water in the step (A-1) is preferably 10 parts by mass or more, more preferably 150 parts by mass or more, still more preferably 250 parts by mass or more, yet still more preferably 350 parts by mass or more, even yet still more preferably 450 parts by mass or more, even still more preferably 550 parts by mass or more, even still more further preferably 650 parts by mass or more, and even yet still more further preferably 750 parts by mass or more, and preferably 8,000 parts by mass or less, more preferably 5,000 parts by mass or less, still more preferably 3,500 parts by mass or less, yet still more preferably 2,500 parts by mass or less, and even yet still more preferably 1,500 parts by mass or less based on 100 parts by mass of the solid component of the plant-based biomass.

(H-Factor)

As for the treatment in the step (A-1), from the viewpoint of increasing the collection rate of the lignin degradation product (B) as well as the viewpoint of economy, the H-factor is preferably 0.1 or more, more preferably 0.5 or more, still more preferably 1 or more, and yet still more preferably 2 or more, and preferably 3,000 or less, more preferably 1,500 or less, still more preferably 1,000 or less, yet still more preferably 500 or less, even yet still more preferably 250 or less, even still more preferably 100 or less, even still more further preferably 50 or less, and even yet still more further preferably 30 or less.

The H-factor is one which has hitherto been used as a control index in a pulp digestion process and in which the effect of temperature and time is one variable.

In the treatment of the step (A-1), when the temperature is high, not only the reaction is promoted, but also the time is related thereto at the same time. Therefore, when the delignification reaction rate at 100° C. is defined as 1, a relative rate at other temperature is determined according to the Arrhenius equation and calculated by the H-factor that is the product of a time at that temperature.

In the present invention, the H-factor is an index expressing a total amount of heat given in the reaction system by the treatment with an alkali of the biomass and expressed according to the following equation (1). The H-factor (HF) is calculated by integrating a time t at which the biomass and the alkali solution come into contact with each other.

$$HF = \int_0^t \exp(43.2 - 16115/T) dt \quad (1)$$

Here, t is a time (h); T is an absolute temperature (K); and the integral range is 0 to t.

For example, in order that the H-factor may satisfy 3 or more, in the case of undergoing the heat treatment at 70° C., the treatment time of about 150 hours is required; in the case of undergoing the heat treatment at 85° C., the treatment time of about 20 hours is required; and in the case of undergoing the heat treatment at 100° C., the treatment time of about 4.5 hours is required.

From the viewpoint of increasing the collection rate of the lignin degradation product (B), shortening the cycle time, and enhancing the economic potential, it is preferred that the temperature and time of the treatment of the step (A-1) are set up.

Accordingly, the temperature of the treatment of the step (A-1) is, from the viewpoint of increasing the collection rate of the lignin degradation product (B) and shortening the cycle time, preferably 50° C. or higher, more preferably 70° C. or higher, even more preferably 80° C. or higher and still more preferably 90° C. or higher, and from the viewpoint of increasing the collection rate of the lignin degradation product (B) and enhancing the economic potential, the temperature is preferably 180° C. or lower, more preferably 150° C. or lower, still more preferably 140° C. or lower, yet still more preferably 130° C. or lower, and even yet still more preferably 120° C. or lower.

The time for the treatment of the step (A-1) means the time for which the treatment is carried out at a temperature falling within the temperature range, and therefore could not be indiscriminately defined since it varies depending on the scale of the treatment equipment and on the difference in the heating or cooling rate, but from the viewpoint of increasing the lignin collection rate, the time is preferably 0.1 hours or more, more preferably 0.5 hours or more, even more preferably 1 hour or more, and further more preferably 1.5 hours or more, and the upper limit of the time is not specifically limited, and may be, for example, 1 month or less, preferably 1 week or less. From the viewpoint of increasing the lignin collection rate, shortening the cycle time and enhancing the economic potential, the time is preferably 30 hours or less, more preferably 20 hours or less, even more preferably 15 hours or less, and further more preferably 10 hours or less.

[Step (A-2)]

The step (A-2) is a step of separating a lignin degradation product having an aldehyde yield, according to an alkaline nitrobenzene oxidation method, of 12% by mass or more, from the reaction product obtained in the step (A-1).

The lignin degradation product generally exists in the aqueous phase part in the reaction product obtained through the treatment of the step (A-1). Accordingly, in the step (A-2), the solid component of the plant-based biomass and the aqueous phase are separated from each other and the lignin degradation product for the present invention is taken out therefrom.

In addition to the separation treatment, the aqueous phase may also be taken out by washing the lignin degradation product existing in the solid part (in the solid phase) of the separated alkali-processed biomass with water to thereby extract the product in water.

Specifically, the step is for collecting the aqueous phase from the reaction product in the step (A-1) using a mesh or filter paper, or collecting the aqueous phase after washing of the solid part of the alkali-treated biomass in the step (A-1). The resultant lignin degradation product may be further treated through a dialytic membrane and so on to remove an acid or a basic compound.

[Step (A-3)]

The step (A-3) is a step of collecting or fractionating a product having a specific molecular weight from the lignin degradation product of a water-soluble component obtained in the step (A-2).

The method of fractionating a lignin degradation product into a fraction having a specific molecular weight includes any method of a method of membrane separation through an ultrafiltration membrane, a reverse osmosis membrane and so on, a method of precipitating a specific lignin degradation product by addition of an acid or an organic solvent, a method of evaporating the organic solvent for solidification followed by adding an organic solvent for solid-liquid separation (solvent fractionation), a gel filtration method, and a method of combination thereof. According to such a method, the weight average molecular weight of the lignin degradation product may be appropriately adjusted.

These methods may be repeated.

The organic solvent is, from the viewpoint of increasing the lignin degradation product extraction efficiency, preferably one or more selected from alcohols, nitriles, ethers and ketones.

The alcohols include methanol, ethanol, diethylene glycol, n-propanol, isopropanol, 2-butanol, isobutanol, t-butyl alcohol and so on. The nitriles include acetonitrile and so on. The ethers include tetrahydrofuran, dioxane and so on. The ketones include acetone, methyl ethyl ketone and so on.

One alone of these organic solvent may be used, or two or more kinds thereof may be used in combination.

Among these organic solvents, from the viewpoint of increasing the lignin degradation product extraction efficiency and the safety, one or more selected from methanol, ethanol, isopropanol, 2-butanol, acetonitrile, tetrahydrofuran, dioxane, acetone and methyl ethyl ketone are preferred; one or more selected from methanol, ethanol, isopropanol, 2-butanol and acetone are more preferred; and acetone is even more preferred.

In the case where the organic solvents are mixed, acetone/methanol, acetone/ethanol, ethanol/methanol and so on may be used. The organic solvent may be mixed with water for use herein.

The step (A-3) may be repeated.

[Method B]

[Step (B-1)]

The step (B-1) is a step of subjecting a plant-based biomass to an enzymatic saccharification treatment to obtain a saccharification residue.

(Milling Treatment of Plant-Based Biomass)

In the case where a plant-based biomass is previously milled, preferably, the plant-based biomass is subjected to a milling treatment in the presence of a basic compound, from the viewpoint of increasing the milling efficiency, increasing the saccharification rate and increasing the production efficiency. After the treatment, it is preferred that the resultant is neutralized with an acid.

The basic compound which is used for the milling treatment includes the same ones as those described for the step (A-1) hereinabove. Among those, from the viewpoint of improving the enzymatic saccharification rate, the basic compound is preferably an alkali metal hydroxide or an alkaline earth metal hydroxide, more preferably an alkali metal hydroxide, and still more preferably sodium hydroxide or potassium hydroxide.

Assuming that all of holocelluloses in the plant-based biomass are cellulose, from the viewpoint of improving saccharification efficiency, the amount of the basic compound which is used for the milling treatment is preferably 0.01 molar times or more, more preferably 0.05 molar times or more, and still more preferably 0.1 molar times or more per mole of an anhydroglucose unit that constitutes the cellulose; and from the viewpoint of neutralization of the basic compound and/or washing, it is preferably 10 molar times or less, more preferably 8 molar times or less, still more preferably 5 molar times or less, and yet still more preferably 1.5 molar times or less.

The water content at the time of milling treatment is preferably 0.1% by mass or more, more preferably 0.5% by mass or more, still more preferably 1% by mass or more, and yet still more preferably 2% by mass or more, and preferably 40% by mass or less, more preferably 30% by mass or less, and still more preferably 20% by mass or less relative to the dry mass of the plant-based biomass. When the water content at the time of milling treatment falls within the aforementioned range, the milling efficiency of the plant-based biomass as well as the mixing/permeation/diffusibility between the lignocellulose raw material and the basic compound is improved, and the saccharification treatment of the step (B-1) efficiently proceeds.

The water content at the time of milling treatment means the water content relative to the dry mass of the plant-based biomass, and it can be properly regulated by decreasing the water content included in the plant-based biomass or the basic compound by a drying treatment, increasing the water content by the addition of water at the time of milling treatment and so on.

From the viewpoint of increasing the yield of the lignin degradation product (B) and increasing the saccharification efficiency, the average particle diameter of the plant-based biomass obtained after the milling treatment is preferably 1 μm or more, and more preferably 5 μm or more, and preferably 150 μm or less, and more preferably 100 μm or less. The average particle diameter of the plant-based biomass can be measured with a laser diffraction/scattering type particle size distribution analyzer "LA-950" (available from Horiba Ltd.).

From the viewpoint of increasing the yield of the lignin degradation product (B) and increasing the saccharification efficiency, the cellulose I-type crystallinity of the plant-based biomass which is obtained after the milling treatment is preferably 0% or more, and preferably 40% or less, more preferably 30% or less, still more preferably 20% or less, and yet still more preferably 15% or less. The cellulose I-type crystallinity of the plant-based biomass is one calculated by the Segal method from a diffraction intensity value by the X-ray diffraction method and is defined according to the following calculation equation (1).

$$\text{Cellulose } I\text{-type crystallinity (\%)} = [(I_{22.6} - I_{18.5})/I_{22.6}] \times 100 \quad (1)$$

$I_{22.6}$ represents a diffraction intensity of a lattice plane (002 plane) (diffraction angle $2\theta=22.6°$) in the X-ray diffraction; and $I_{18.5}$ represents a diffraction intensity of an amorphous part (diffraction angle $2\theta=18.5°$).

(Saccharification Treatment)

From the viewpoint of increasing the saccharification efficiency, increasing the yield of the lignin degradation product and preventing the denaturation of the lignin degradation product, enzyme used for the saccharification treatment of the step (B-1) includes cellulase and hemicellulase. These enzymes can be used alone or in combination of two or more thereof.

Here, the cellulase refers to an enzyme that hydrolyzes a glucoside bond of β-1,4-glucan of cellulose and is a generic term of enzymes called endoglucanase, exoglucanase, cellobiohydrolase, β-glucosidase and so on. As the cellulase which is used in the present invention, commercially available cellulase preparations and those derived from animals, plants, and microorganisms are included.

Preferred examples of the cellulase include cellulase derived from *Trichoderma reesei*, *Trichoderma viride* or *Humicola insolens*, such as Celluclast 1.5 L (trade name, available from Novozymes A/S), TP-60 (trade name, available from Meiji Seika Kaisha, Ltd.), Cellic CTec2 (trade name, available from Novozymes A/S), Accellerase DUET (trade name, available from Genencor International, Inc.), and Ultraflo L (trade name, available from Novozymes A/S).

In addition, preferred examples of β-glucosidase that is one kind of cellulase include an enzyme derived from *Aspergillus niger* (for example, Novozyme 188 (trade name, available from Novozymes A/S) and β-glucosidase, available from Megazyme International), and an enzyme derived from *Trichoderma reesei, Penicillium emersonii* and so on.

In addition, specific examples of hemicellulase include a hemicellulase preparation derived from *Trichoderma reesei*, such as Cellic HTec2 (a trade name, available from Novozymes A/S); and xylanase derived from *Bacillus* sp. KSM-N546 (FERM P-19729); and besides, xylanase derived from *Aspergillus niger, Trichoderma viride, Humicola insolens*, or *Bacillus alcalophilus*; and xylanase derived from other genera.

From the viewpoint of increasing the saccharification efficiency and suppressing denaturation of the lignin degradation product, the enzyme is preferably one or more selected from the above-mentioned cellulase and hemicellulase, more preferably one or more selected from cellobiohydrolase, β-glucosidase, endoglucanase, and hemicellulase, and still more preferably one or more selected from cellobiohydrolase and endoglucanase.

In the step (B-1), a treatment condition in the case of subjecting the plant-based biomass to an enzymatic saccharification treatment can be properly selected by the lignin content in the plant-based biomass, the kind of the enzyme used, and so on.

For example, in the case of using the aforementioned enzyme and using the plant-based biomass as a substrate, the saccharification treatment can be conducted by adding the enzyme in an amount of 0.001% (w/v) or more and 15% (w/v) or less to a substrate suspension of 0.5% (w/v) or more and 20% (w/v) or less and undergoing the reaction in a buffer solution having a pH of 2 or more and 10 or less at a reaction temperature of 10° C. or higher and 90° C. or lower for a reaction time of 30 minutes or more and 5 days or less.

It is preferred that the pH of the aforementioned buffer solution is properly selected according to the kind of the enzyme used. The pH is preferably 3 or more, and more preferably 4 or more, and preferably 7 or less, and more preferably 6 or less.

It is preferred that the aforementioned treatment temperature is properly selected according to the kind of the enzyme used. The treatment temperature is preferably 20° C. or higher, and more preferably 40° C. or higher, and preferably 70° C. or lower, and more preferably 60° C. or lower.

Furthermore, it is preferred that the aforementioned treatment time is properly selected according to the kind of the enzyme used. The treatment time is preferably 0.5 days or more, and preferably 3 days or less, and more preferably 2 days or less.

(Saccharification Residue)

By subjecting the plant-based biomass to an enzymatic saccharification treatment with the enzyme, the saccharification residue is obtained. Here, the saccharification residue refers to a solid component resulting from separation of the mixture after the enzymatic saccharification treatment by means of solid-liquid separation, such as centrifugation. By washing this solid component with water several times, a water-soluble polysaccharide can be removed. Thereafter, the wet-state saccharification residue may be subjected to the next step (B-2), or the saccharification residue may be powdered by means of drying. From the viewpoint of improvement of production efficiency, it is preferred to subject the wet-state saccharification residue to the next step (B-2). In the case of undergoing the drying treatment, from the viewpoint of suppression of excessive denaturation of lignin, it is preferred to dry the saccharification residue at 100° C. or lower, and it is more preferred to subject the saccharification residue to freeze-drying.

[Step (B-2)]

The step (B-2) is a step of subjecting the saccharification residue to a heat treatment in a solvent containing at least one selected from water and organic solvents having a solubility in water (hereinafter also referred to simply as "solubility") at 20° C. of 90 g/L or more, to obtain a heat treatment solution containing a lignin degradation product.

From the viewpoint of obtaining a low denatured lignin degradation product in a high yield rate, the solvent which is used in the step (B-2) is preferably a solvent including water and an organic solvent having a solubility in water at 20° C. of 90 g/L or more.

The organic solvent and the compositional ratio of the solvent for use in the step (B-2) are the same as those shown in the step (A-3).

In the step (B-2), from the viewpoint of increasing the yield of the lignin degradation product and from the viewpoint of controlling the molecular weight of the lignin degradation product, it is preferred to further use an acid or a base, and it is more preferred to further use an acid.

The acid include inorganic acids, such as hydrochloric acid, sulfuric acid, nitric acid, phosphoric acid, and boric acid; organic acids, such as p-toluenesulfonic acid, trifluoroacetic acid, trichloroacetic acid, formic acid, acetic acid, and citric acid; Lewis acids, such as aluminum chloride, and metal triflate; fatty acids, such as caprylic acid, pelargonic acid, capric acid, lauric acid, myristic acid, palmitic acid, stearic acid, oleic acid, and linoleic acid; and heteropoly acids. Among those, from the viewpoint of increasing the yield of the lignin degradation product and obtaining a low-molecular weight lignin degradation product, one or more selected from hydrochloric acid, sulfuric acid, phosphoric acid, paratoluenesulfonic acid and aluminum chloride are preferred; one or more selected from hydrochloric acid and phosphoric acid are more preferred; and hydrochloric acid is still more preferred.

The base includes the same ones as those useful as the basic compound in the aforementioned milling treatment. Among those, from the viewpoint of increasing the yield of the lignin degradation product and obtaining a high-molecular weight lignin degradation product, one or more selected from an alkali metal hydroxide and an alkaline earth metal hydroxide are preferred; an alkali metal hydroxide is more preferred; and one or more selected from sodium hydroxide and potassium hydroxide are still more preferred.

The aforementioned acids or bases can be used alone or in combination of two or more thereof.

From the viewpoint of increasing the productivity and increasing the degradability of the lignin degradation product, the amount of the solvent to be used in the step (B-2) is preferably 2 times by mass or more, more preferably 5 times by mass or more, still more preferably 10 times by mass or more, and yet still more preferably 15 times by mass or more, and preferably 40 times by mass or less, and more preferably 30 times by mass or less relative to the solid component of the saccharification residue.

From the viewpoints of improving the separability of the lignin degradation product and increasing the extraction ratio of the lignin degradation product, the content of the organic solvent in the solvent in the step (B-2) is preferably 10% by mass or more, more preferably 30% by mass or more, and still more preferably 40% by mass or more, and preferably 90% by mass or less, more preferably 70% by mass or less, and still more preferably 60% by mass or less.

From the viewpoint of increasing the yield of the lignin degradation product and controlling the molecular weight of the lignin degradation product to be produced, the content of the acid or base is preferably 0.001% by mass or more, and more preferably 0.01% by mass or more, and preferably 1.0% by mass or less, and more preferably 0.5% by mass or less relative to the solvent in the step (B-2).

In the step (B-2), from the viewpoint of increasing the yield of the lignin degradation product, it is preferred to further use a radical scavenger.

The radical scavenger is preferably one or more selected from an aromatic radical scavenger, such as hydroquinone, benzoquinone, methoquinone, and phenol, an amine-based radical scavenger, an organic acid-based radical scavenger, a catechin-based radical scavenger, and molecular hydrogen; more preferably one or more selected from an aromatic radical scavenger and an organic acid-based radical scavenger; and still more preferably an aromatic radical scavenger.

From the viewpoint of suppressing any excessive denaturation of the lignin decomposition product and increasing the yield of the lignin degradation product, the heat treatment temperature in the step (B-2) is preferably 80° C. or higher, more preferably 100° C. or higher, still more preferably 120° C. or higher, and yet still more preferably 150° C. or higher, and preferably 280° C. or lower, more preferably 250° C. or lower, still more preferably 220° C. or lower, and yet still more preferably 200° C. or lower.

From the viewpoint of suppressing any excessive denaturation of the lignin decomposition product and increasing the yield of the lignin degradation product, the heating apparatus which is used in the step (B-2) is preferably an autoclave or a microwave heating apparatus.

From the viewpoint of suppressing any excessive denaturation of the lignin decomposition product and increasing the yield of the lignin degradation product, the pressure at the time of heat treatment in the step (B-2) is preferably 0.1 MPa or more, and more preferably 0.5 MPa or more, and preferably 15 MPa or less, more preferably 10 MPa or less, still more preferably 5 MPa or less, and yet still more preferably 3 MPa or less.

The time for the heat treatment in the step (B-2) may be properly selected according to the amount of the saccharification residue. From the viewpoint of suppressing any excessive denaturation of the lignin decomposition product and increasing the yield of the lignin degradation product, the time is preferably 1 minute or more, more preferably 2 minutes or more, and still more preferably 10 minutes or more, and preferably 5 hours or less, more preferably 3 hours or less, still more preferably 2 hours or less, and yet still more preferably 1 hour or less.

[Step (B-3)]

The step (B-3) is a step of subjecting the heat treatment solution obtained in the step (B-2) to solid-liquid separation to remove insoluble components, thereby obtaining a lignin degradation product.

As a method of obtaining the lignin degradation product, for example, in addition to solid-liquid separation, such as filtration and centrifugation, steps of solvent removal by distillation, washing, drying and so on can be properly combined. In the case of adding an acid or a base in the step (B-2), a step of undergoing neutralization is included. These steps can be conducted in the usual way. For example, there is exemplified a method in which the insoluble components are removed by means of solid-liquid separation of the heat treatment solution obtained in the step (B-2), the aforementioned organic solvent and water included in the liquid component are evaporated away under reduced pressure, and the obtained residue is washed with water to obtain a lignin degradation product. When the residue after the solvent removal by evaporation is washed with water, water-soluble polysaccharides, salts and so on can be removed, and the purity of the lignin degradation product can be increased.

[Step (B-4)]

In the method B, a step (B-4) of taking out a lignin degradation product having a low molecular weight from the lignin degradation product obtained in the step (B-3) may be included. Examples of the method of taking out a lignin degradation product having a low molecular weight include solvent fractionation, and membrane separation with an ultrafiltration membrane, a reverse osmosis membrane and so on.

Examples of the step (B-4) in the solvent fractionation include a step of extracting a lignin degradation product in a solvent containing at least one selected from water and organic solvents having a solubility in water at 20° C. of 80 g/L or more, from the lignin degradation product obtained in the step (B-3). Through the step (B-4), the weight average molecular weight of the resultant lignin degradation product can be properly adjusted, and a lignin degradation product having a low molecular weight can be obtained.

The organic solvent and the compositional ratio of the solvent in this step may be the same ones as those shown in the step (B-2). The step (B-4) may be repeated.

<Anti-Aging Agent (C)>

The rubber composition of the present invention contains, as an anti-aging agent (C), one or more selected from the group consisting of a bisphenol compound, an aromatic secondary amine compound, a hindered phenol compound, a monophenol compound, a phosphite compound, a polyphenol compound, a benzimidazole compound, a dithiocarbamate compound, a thiourea compound, a quinoline compound and a special wax-based anti-aging agent, from the viewpoint of suppressing the grip force of the rubber composition from reducing over long periods. Among these, one or more selected from a bisphenol compound, an aromatic secondary amine compound, a hindered phenol compound, a monophenol compound and a phosphite compound are preferred.

(Bisphenol Compound)

As the bisphenol compounds, those represented by the following formula (1) or (2) are preferred.

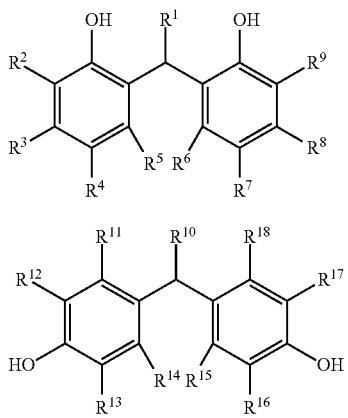

(1)

(2)

In the formulae (1) and (2), $R^1$ to $R^9$ and $R^{10}$ to $R^{18}$ each independently represent a hydrogen atom or a linear or branched alkyl group having 1 to 6 carbon atoms.

The carbon number of the alkyl group for $R^1$ to $R^9$ and $R^{10}$ to $R^{18}$ is more preferably 1 to 4.

Preferred examples of the bisphenol compounds include 2,2'-methylenebis(4-ethyl-6-tert-butylphenol), 2,2'-methylenebis(4-methyl-6-tert-butylphenol), 4,4'-butylidenebis(3-methyl-6-tert-butylphenol), 4,4'-thiobis(3-methyl-6-tert-butylphenol), and a butylation reaction product of p-cresol and dicyclopentadiene. Among these, one or more selected from 2,2'-methylenebis(4-ethyl-6-tert-butylphenol), 2,2'-methylenebis(4-methyl-6-tert-butylphenol) and 4,4'-butylidenebis(3-methyl-6-tert-butylphenol) are more preferred.

(Aromatic Secondary Amine Compound)

As the aromatic secondary amine compounds, those represented by the following formula (3) are preferred.

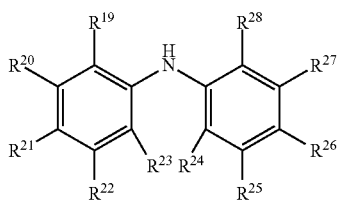

(3)

In the formula (3), $R^{19}$, $R^{20}$, and $R^{22}$ to $R^{25}$ each independently represent a hydrogen atom or an alkyl group having 1 to 6 carbon atoms; $R^{21}$ represents a hydrogen atom, an alkyl group having 1 to 10 carbon atoms, an alkenyl group having 1 to 6 carbon atoms, an alkylphenyl group having 9 carbon atoms in total, or a naphthylamino group; $R^{26}$ represents a hydrogen atom, an alkyl group having 1 to 10 carbon atoms, an alkenyl group having 1 to 6 carbon atoms, an alkylphenyl group having 9 carbon atoms in total, a p-toluenesulfonylamino group, a naphthylamino group, an anilino group, or an amino group having an alkyl group having 1 to 8 carbon atoms; $R^{27}$ and $R^{28}$ each independently represent a hydrogen atom, an alkyl group having 1 to 6 carbon atoms, or an alkenyl group having 1 to 6 carbon atoms. $R^{26}$ and $R^{27}$ may bond to each other to form a ring, and $R^{27}$ and $R^{28}$ may bond to each other to form a ring, provided that $R^{26}$ and $R^{27}$ and $R^{28}$ do not form a ring together.

$R^{21}$ and $R^{26}$ each are more preferably a naphthylamino group, a 1,3-dimethylbutylamino group and so on.

In the formula (3), a compound where a combination of $R^{26}$ and $R^{27}$ and a combination of $R^{27}$ and $R^{28}$ each independently may form a ring by bonding the two in each combination includes N-phenyl-1-naphthylamine, N,N'-di-2-naphthyl-p-phenylenediamine and so on.

Preferred examples of the aromatic secondary amine compounds include N-phenyl-1-naphthylamine, alkylated diphenylamine, octylated diphenylamine, 4,4'-bis(α,α-dimethylbenzyl)diphenylamine, p-(p-toluenesulfonylamide)diphenylamine, N,N'-di-2-naphthyl-p-phenylenediamine, N,N'-diphenyl-p-phenylenediamine, N,N'-2'-naphthyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, and a reaction product of diphenylamine and acetone. Among these, one or more selected from N-phenyl-1-naphthylamine, 4,4'-bis(α,α-dimethylbenzyl)diphenylamine, N,N'-di-2-naphthyl-p-phenylenediamine, N,N'-diphenyl-p-phenylenediamine, N-phenyl-N'-(1,3-dimethylbutyl)-p-phenylenediamine and N-phenyl-N'-isopropyl-p-phenylenediamine are more preferred.

(Hindered Phenol Compound)

As the hindered phenol compounds, those represented by any of the following formulae (4) to (6) are preferred.

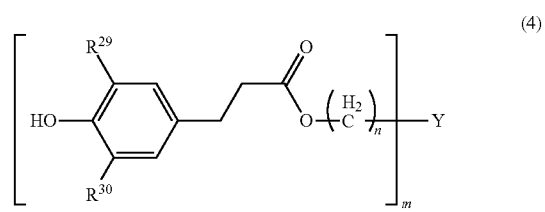

(4)

In the formula (4), $R^{29}$ and $R^{30}$ each represent a hydrogen atom or an alkyl group having 1 to 4 carbon atoms; Y represents a carbon atom, a sulfur atom or an alkyl group having 1 to 20 carbon atoms; m represents an integer of 1 to 4; and n represents an integer of 1 to 3.

In the formula (4), the alkyl group for $R^{29}$ and $R^{30}$ is more preferably a tert-butyl group; the carbon number of the alkyl group for Y is preferably 1 to 18, more preferably 2 to 16, and even more preferably 3 to 14.

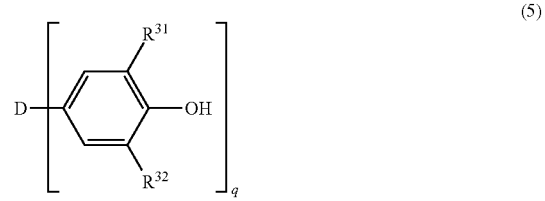

(5)

(5a)

-continued

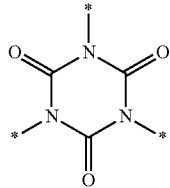
(5b)

In the formula (5), $R^{31}$ and $R^{32}$ each represent a hydrogen atom, or an alkyl group having 1 to 4 carbon atoms; q represents a number of 1 to 3; and D represents a group of (5a) or (5b) where * indicates a bonding site, when q is 1, one bonding site is present, and when q is 3, three bonding sites are present.

In the formula (5), the alkyl group for $R^{31}$ and $R^{32}$ is more preferably a tert-butyl group.

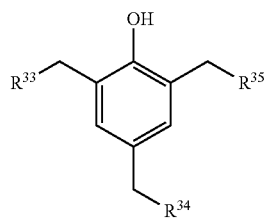
(6)

In the formula (6), $R^{33}$, $R^{34}$ and $R^{35}$ each independently represent a hydrogen atom, or a thioether group having an alkyl group having 1 to 20 carbon atoms, but all of these are not hydrogen atoms.

The carbon number of the alkyl group that substitutes for the thioether group for $R^{33}$, $R^{34}$ and $R^{35}$ is preferably 1 to 18, more preferably 2 to 16, and even more preferably 3 to 14.

The thioether group for $R^{33}$, $R^{34}$ and $R^{35}$ is more preferably a thioether group having an alkyl group having 4 to 12 carbon atoms.

Preferred examples of the hindered phenol compounds include "Irganox" series available from BASF SE, and "Adekastab" series available from Adeka Corporation. More specifically, the compounds include [3-[3-(3,5-di-tert-butyl-4-hydroxyphenyl)propionyloxy]-2.2'-bis[3-(3,5-di-tert-butyl-4-hydroxyphenyl)propionyloxymethyl]propyl] 3-(3,5-di-tert-butyl-4-hydroxyphenyl)propionate (Irganox 1010), stearyl 3-(3,5-di-tert-butyl-4-hydroxyphenyl)propionate (Irganox 1076), 2,4-bis(octylthiomethyl)-6-methylphenol (Irganox 1520), 2,4-bis(dodecylthiomethyl)-6-methylphenol, 2,2'-thiodiethyl bis[3-(3,5-di-tert-butyl-4-hydroxyphenyl) propionate], N,N'-hexamethylene bis[3-(3,5-di-tert-butyl-4-hydroxyphenyl)propanamide], octyl 3,5-di-tert-butyl-4-hydroxy-hydrocinnamate, 2,4,6-tris(3',5'-di-tert-butyl-4'-hydroxybenzyl)mesitylene, calcium bis[3,5-di(tert-butyl)-4-hydroxybenzyl(ethoxy)phosphinate], bis[3-(3-tert-butyl-4-hydroxy-5-methylphenyl)propionate] [ethylenebis (oxyethylene)], 1,6-hexanediol bis[-(3,5-di-tert-butyl-4-hydroxyphenyl)propionate], 1,3,5-tris[[3,5-bis(1,1-dimethylethyl)-4-hydroxyphenyl]methyl]-1,3,5-triazine-2, 4,6-(1H,3H,5H)-trione, 4-[[4,6-bis(octylthio)-1,3,5-trizin-2-yl]amino]-2,6-di-tert-butylphenol, 1,1,3-tris(2-methyl-4-hydroxy-5-tert-butylphenyl)butane, 4,4'-butylidene bis(6-tert-butyl-m-cresol, 3,9-bis[1,1-dimethyl-2-[3-(3-tert-butyl-4-hydroxy-5-methylphenyl)propionyloxy]ethyl]-2,4,8,10-tetraoxaspiro[5,5]undecane, and pentaerythritol tetrakis[3-(3,5-di-tert-butyl-4-hydroxyphenyl)propionate].

Among these, one or more selected from [3-[3-(3,5-di-tert-butyl-4-hydroxyphenyl)propionyloxy]-2,2'-bis[3-(3,5-di-tert-butyl-4-hydroxyphenyl)propionyloxymethyl]propyl] 3-(3,5-di-tert-butyl-4-hydroxyphenyl)propionate (Irganox 1010), stearyl 3-(3,5-di-tert-butyl-4-hydroxyphenyl)propionate (Irganox 1076), and 2,4-bis(octylthiomethyl)-6-methylphenol (Irganox 1520) are more preferred.

(Monophenol Compound)

Preferred examples of the monophenol compounds include one or more selected from 2,6-di-tert-butyl-4-methylphenol (BHT), and mono (or di, or tri) (α-methylbenzyl) phenol.

(Phosphite Compound)

As the phosphite compounds, those represented by the following formula (7) are preferred.

$$P(XR^{36})_{3-q}(XR^{37})_q \qquad (7)$$

In the formula (7), X represents an oxygen atom or a sulfur atom, $R^{36}$ represents an alkyl group having 1 to 20 carbon atoms, a phenyl group, or a monoalkyl or dialkylphenyl group where the alkyl group has 1 to 12 carbon atoms, $R^{37}$ represents an alkyl group having 8 to 20 carbon atoms, and q represents 0 to 3.

In the formula (7), $R^{36}$ is more preferably an alkyl group having 2 to 18 carbon atoms, a phenyl group, a monoalkylphenyl group where the alkyl group has 1 to 10 carbon atoms, or a dialkylphenyl group where the alkyl group has 2 to 8 carbon atoms.

Preferred examples of the phosphite compounds include commercial products of phosphites, JP, JPM, JPS, JPE, JPP, JA, JPH and HBP, available from Johoku Chemical Co., Ltd. More specifically, the compounds include triphenyl phosphite, trisnonylphenyl phosphite, tricresyl phosphite, triethyl phosphite, tris(2-ethylhexyl) phosphite, tridecyl phosphite, trilauryl phosphite, tris(tridecyl) phosphite, trioleyl phosphite, diphenylmono(2-ethylhexyl) phosphite, diphenylmonodeyl phosphite, diphenylmono(tridecyl) phosphite, trilauryl trithiophosphite, diethylhydrogen phosphite, bis(2-ethylhexyl)hydrogen phosphite, dilaurylhydrogen phosphite, dioleylhydrogen phosphite, diphenylhydrogen phosphite, tetraphenyldipropylene glycol diphosphite, mixture of tetraphenyl(tetratridecyl)pentaerythritol tetraphosphite and bis(2-ethylhexyl) phthalate, tetra(C12 to C15 alkyl)-4,4'-isopropylidenediphenyl diphosphite, mixture of bis(tridecyl)pentaerythritol diphosphite and bis(nonylphenyl)pentaerythritol diphosphite, bis(decyl)pentaerythritol diphosphite, bis(tridecyl)pentaerythritol diphosphite, tristearyl phosphite, distearylpentaerythritol diphosphite, tris(2,4-di-tert-butylphenyl) phosphite, tris(nonylphenyl) phosphite, hydrogenated bisphenol A/pentaerythritol phosphite polymer, and hydrogenated bisphenol A phosphite polymer.

Among these, one or more selected from triphenyl phosphite, trisnonylphenyl phosphite and tris(2,4-di-tert-butylphenyl) phosphite are more preferred.

Preferred examples of the polyphenol compounds include 2,5-di-tert-butylhydroquinone, and 2,5-di-tert-amylhydroquinone.

The benzimidazole anti-aging agents include 2-mercaptobenzimidazole, 2-mercaptomethylbenzimidazole, and 2-mercaptobenzimidazole zinc salt.

Preferred examples of the dithiocarbamate compounds include nickel dibutyldithiocarbamate; and preferred examples of the thiourea compounds include 1,3-bis(dimethylaminopropyl)-2-thiourea, and tributylthiourea.

Preferred examples of the quinoline compounds include 2,2,4-trimethyl-1,2-dihydroquinoline polymer, and 6-ethoxy-1,2-dihydro-2,2,4-trimethylquinoline The other anti-aging agents include dilauryl thiodipropionate.

<Filler (D)>

The rubber composition of the present invention, especially the rubber composition for shoe soles preferably contains a filler (D) for improving abrasion resistance and mechanical strength. The filler includes one or more selected from the group consisting of a carbonaceous filler such as carbon black, high-styrene resin and corn starch, as well as calcium carbonate, clay, talc, silica, zeolite, diatomaceous earth, alumina, aluminum sulfate, barium sulfate, calcium sulfate, basic magnesium carbonate and so on.

The carbon black includes HAF, FEF, GPF, SRF, N339, SAF, ISAF, IISAF-HS(N285) and so on, and in addition thereto, a dual phase filler of carbon and silica where silica is carried on the surface of carbon black.

Among these, from the viewpoint of enhancing and increasing the fashionability and the grip force of shoe soles, an inorganic filler is preferred; silica and alumina are more preferred; and silica is even more preferred.

The silica includes a dry-process silica and a wet-process silica. Among these, a wet-process silica containing hydrous silicate as the main component is preferred. The wet-process silica includes those produced according to a precipitation method, a gel method, and a sol-gel method. Above all, a precipitation-process silica is preferred.

The nitrogen adsorption specific surface area of silica (measured in the BET method according to ASTM D3037-81) is, from the viewpoint of grip force and abrasion resistance, preferably 50 m$^2$/g or more, more preferably 100 m$^2$/g or more, and is preferably 400 m$^2$/g or less, more preferably 220 m$^2$/g or less.

One alone of these fillers may be used or two or more kinds thereof may be used in combination.

<Silane Coupling Agent (E)>

Preferably, the rubber composition of the present invention, especially the rubber composition for shoe soles further contains a silane coupling agent.

Any known silane coupling agent is usable. Above all, one or more selected from the compounds represented by any of the following formulae (8) to (11) are preferred.

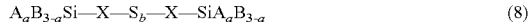

In the formula, A represents an alkoxy group having 1 or more and 3 or less carbon atoms, or a chlorine atom; B represents an alkyl group having 1 or more and 3 or less carbon atoms; X represents an alkane diyl group or an alkene diyl group each having 1 or more and 9 or less carbon atoms, or an arylene group having 7 or more and 15 or less carbon atoms; a is an integer of 1 or more and 3 or less; and b is an integer of 1 or more and 6 or less and may have a distribution, provided that when a is 1, then two B's may be the same as or different from each other, and when a is 2 or 3, then two or three A's may be the same as or different from each other.

In the formula, A, B, X, and a are the same as in the formula (8); and Y represents a mercapto group, a vinyl group, an amino group, a glycidoxy group, or an epoxy group.

In the formula, A, B, X, a, and b are the same as in the formula (8); and Z represents a benzothiazolyl group, an N,N-dimethylthiocarbamoyl group, a methacryloyl group, or a saturated or unsaturated hydrocarbon group having 1 or more and 15 or less carbon atoms.

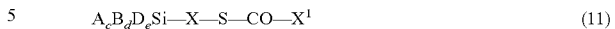

In the formula, A, B and X are the same as in the formula (8); $X^1$ represents a saturated or unsaturated alkyl group having 1 or more and 20 or less carbon atoms, or an arylene diyl group having 6 or more and 15 or less carbon atoms; D represents A, B, or an —[O(XO)$_n$]$_{0.5}$ group; n is an integer of 1 or more and 4 or less and may have a distribution; X is the same as mentioned above; and c, d, and e are numbers satisfying the relations of (0≤c≤3), (0≤d≤2), (0≤e≤1), and (c+d+2e=3).

Examples of the silane coupling agent represented by the general formula (8) include bis(3-triethoxysilylpropyl)tetrasulfide, bis(3-trimethoxysilylpropyl)tetrasulfide, bis(3-methyldimethoxysilylpropyl)tetrasulfide, bis(3-triethoxysilylethyl)tetrasulfide, bis(3-triethoxysilylpropyl)disulfide, bis(3-trimethoxysilylpropyl)disulfide, and bis(3-triethoxysilylpropyl)trisulfide.

Examples of the silane coupling agent represented by the general formula (9) include 3-mercaptopropyltrimethoxysilane, 3-mercaptopropyltriethoxysilane, vinyltriethoxysilane, vinyltrimethoxysilane, 3-aminopropyltriethoxysilane, 3-aminopropyltrimethoxysilane, 3-mercaptopropylmethyldimethoxysilane, 3-glycidoxypropyltrimethoxysilane, and 3-glycidoxypropylmethyldiethoxysilane.

Examples of the silane coupling agent represented by the general formula (10) include 3-trimethoxysilylpropyl-N,N-dimethylcarbamoyl tetrasulfide, 3-trimethoxysilylpropylbenzothiazolyl tetrasulfide, 3-trimethoxysilylpropylmethacryloyl monosulfide, and 3-triethoxysilylpropyl-n-octyl disulfide.

Examples of the silane coupling agent represented by the general formula (11) include 3-octanoylthiopropyltriethoxysilane.

The silane coupling agent may be used alone, or may be used in combination of two or more thereof.

[Rubber Composition]

The rubber composition of the present invention contains (A) a rubber component, (B) a lignin degradation product having an aldehyde yield, according to an alkaline nitrobenzene oxidation method, of 12% by mass or more, and (C) an anti-aging agent.

The content of the rubber component (A) in the rubber composition is preferably 30% by mass or more, more preferably 40% by mass or more, even more preferably 50% by mass or more, further more preferably 55% by mass or more, and is preferably 90% by mass or less, more preferably 80% by mass or less, even more preferably 75% by mass or less, and further more preferably 70% by mass or less.

The content of the lignin degradation product (B) in the rubber composition is, from the viewpoint of increasing the grip force of the rubber composition, preferably 1 part by mass or more relative to 100 parts by mass of the rubber component (A), more preferably 1.5 parts by mass or more, even more preferably 2.0 parts by mass or more, still more preferably 2.5 parts by mass or more, further more preferably 3 parts by mass or more, and is preferably 30 parts by mass or less, more preferably 20 parts by mass or less, even more preferably 15 parts by mass or less, still more preferably 12 parts by mass or less, further more preferably 9 parts by mass or less, and still further more preferably 5 parts by mass or less.

The content of the lignin degradation product (B) in the rubber composition is preferably 0.5% by mass or more, more preferably 1.0% by mass or more, even more preferably 1.5% by mass or more, and is preferably 20% by mass or less, more preferably 15% by mass or less, even more preferably 10% by mass or less, and further more preferably 5% by mass or less.

The amount of lignin (lignin content) in the lignin degradation product (B) is, from the viewpoint of increasing the grip force of the rubber composition, preferably 70% by mass or more, more preferably 75% by mass or more, even more preferably 80% by mass or more, still more preferably 85% by mass or more, and further more preferably 90% by mass or more.

The content of lignin in the rubber composition is, from the viewpoint of increasing the grip force of the rubber composition, preferably 1 part by mass or more relative to 100 parts by mass of the rubber composition (A), more preferably 1.5 parts by mass or more, even more preferably 2.0 parts by mass or more, and is preferably 30 parts by mass or less, more preferably 20 parts by mass or less, even more preferably 15 parts by mass or less, still more preferably 12 parts by mass or less, further more preferably 9 parts by mass or less, and still further more preferably 5 parts by mass or less.

The content of lignin in the rubber composition is preferably 0.45% by mass or more, more preferably 0.9% by mass or more, even more preferably 1.35% by mass or more, and is preferably 18% by mass or less, more preferably 13.5% by mass or less, even more preferably 9% by mass or less, and further more preferably 4.5% by mass or less.

The amount of lignin (lignin content) in the lignin degradation product (B) can be measured according to the method described in the section of Examples.

The content of the anti-aging agent (C) is, from the viewpoint of maintaining the grip force of the rubber composition and improving the abrasion resistance thereof, preferably 0.1 parts by mass or more relative to 100 parts by mass of the rubber component (A), more preferably 0.2 parts by mass or more, even more preferably 0.5 parts by mass or more, further more preferably 0.8 parts by mass or more, and is preferably 10 parts by mass or less, more preferably 8 parts by mass or less, even more preferably 5 parts by mass or less, and further more preferably 3 parts by mass or less.

The content of the anti-aging agent (C) in the rubber composition is preferably 0.05% by mass or more, more preferably 0.1% by mass or more, even more preferably 0.25% by mass or more, and is preferably 6.5% by mass or less, more preferably 5.8% by mass or less, even more preferably 3.7% by mass or less.

From the above-mentioned viewpoints, preferably, the rubber composition of the present invention contains, relative to 100 parts by mass of the rubber component (A), 1 part by mass or more and 30 parts by mass or less of the lignin degradation product (B) and 0.1 parts by mass or more and 10 parts by mass of less of the anti-aging agent (C).

In the case where the rubber composition of the present invention further contains a filler (D), in particular, the content of the inorganic filler is, from the viewpoint of improving abrasion resistance, preferably 10 parts by mass or more relative to 100 parts by mass of the rubber component (A), more preferably 20 parts by mass or more, even more preferably 30 parts by mass or more, and preferably 60 parts by mass or less, more preferably 55 parts by mass or less, and even more preferably 50 parts by mass or less.

In the case where the rubber composition of the present invention further contains a silane coupling agent (E), the content of the silane coupling agent (E) is, from the viewpoint of increasing the grip force of the rubber composition, preferably 3% by mass or more relative to 100 parts by mass of the filler (D), more preferably 5% by mass or more, and is preferably 20% by mass or less, more preferably 15% by mass or less.

The mass ratio of the constituent components in the rubber composition of the present invention is, from the same viewpoints as above, as follows.

The mass ratio of the lignin degradation product (B) to the rubber component (A) [(B)/(A)] is preferably 0.01 or more, more preferably 0.015 or more, even more preferably 0.02 or more, and is preferably 0.3 or less, more preferably 0.2 or less, even more preferably 0.15 or less, still more preferably 0.12 or less, and further more preferably 0.08 or less.

The mass ratio of lignin in the lignin degradation product (B) to the rubber component (A) [(lignin)/(A)] is preferably 0.009 or more, more preferably 0.0135 or more, even more preferably 0.018 or more, and is preferably 0.27 or less, more preferably 0.18 or less, even more preferably 0.135 or less, still more preferably 0.108 or less, and further more preferably 0.072 or less.

The mass ratio of the anti-aging agent (C) to the rubber component (A) [(C)/(A)] is preferably 0.001 or more, ore preferably 0.002 or more, even more preferably 0.005 or more, and is preferably 0.1 or less, more preferably 0.08 or less, even more preferably 0.05 or less, and still more preferably 0.03 or less.

The mass ratio of the anti-aging agent (C) to the lignin degradation product (B) [(C)/(B)] is preferably 0.025 or more, more preferably 0.05 or more, even more preferably 0.125 or more, and is preferably 2.5 or less, more preferably 2.0 or less, even more preferably 1.25 or less, and still more preferably 1.0 or less.

The mass ratio of the filler (D) to the lignin degradation product (B) [(D)/(B)] is preferably 1.3 or more, more preferably 2.0 or more, even more preferably 2.6 or more, still more preferably 3.0 or more, further more preferably 5.0 or more, and is preferably 40 or less, more preferably 26.7 or less, and even more preferably 20 or less.

In the rubber composition, if desired, various compounding agents which are typically used in the rubber industry, for example, stearic acid, process oil, zinc white, UV absorbent, vulcanizing agent, vulcanization accelerator, scorch retarder and softening agent can be contained within a range where the object of the present invention is not hindered.

The rubber composition of the present invention can be produced according to a known method. For example, first, a lignin degradation product (B), an anti-aging agent (C) and optionally a filler (D), a silane coupling agent (E), stearic acid, process oil and a UV absorbent are kneaded with a rubber component (A), using a kneading machine, for example, a Banbury mixer, a roll, an intensive mixer and so on at a temperature of 165° C. or lower. Next, a vulcanizing agent, a vulcanization accelerator, zinc white and others are added thereto, and kneaded at a temperature of 120° C. or lower.

The resultant unvulcanized rubber composition is, according to a known method, processed, molded and heated at 130° C. or higher and 180° C. or lower to be a vulcanized rubber.

The rubber composition of the present invention is favorable for shoe soles. In the case where the composition is used for shoe soles, in general, it is crosslinked before use.

The crosslinking method is not specifically limited, and may be selected in accordance with the shape and the size of the crosslinked product. The rubber composition blended with a crosslinking agent may be cast into a mold having a shoe sole shape and heated therein to be molded and crosslinked at the same time, or the rubber composition blended with a crosslinking agent may be previously molded and then heated to be crosslinked later.

The molding temperature is generally 10 to 220° C., preferably 25 to 120° C. The crosslinking temperature is generally 120 to 200° C., preferably 140 to 180° C., and the crosslinking time is generally 1 to 120 minutes, preferably 3 to 60 minutes.

[Shoe Sole]

The shoe sole of the present invention is produced by using the rubber composition of the present invention.

The shoe sole produced by using the rubber composition of the present invention is excellent in abrasion resistance and slip resistance, and can be therefore used for sports shoes, trekking shoes, climbing shoes, motorbike shoes, commuter shoes, fishing boots, beach shoes, diving shoes, bath shoes, rain shoes and the like. In particular, it is favorable for shoe soles for use in water places.

[Grip Force Improving Agent for Rubber Composition]

The grip force improving agent for rubber compositions of the present invention (slip resistance improving agent) contains (B) a lignin degradation product having an aldehyde yield, according to an alkaline nitrobenzene oxidation method, of 12% by mass or more, as an active ingredient.

The details of the lignin degradation product to be used are as mentioned above.

The content of the lignin degradation product (B) in the grip force improving agent for rubber compositions of the present invention is, from the viewpoint of favorably exhibiting the advantageous effects of the present invention, preferably 50% by mass or more, more preferably 80% by mass or more, even more preferably 90% by mass or more, still more preferably 95% by mass or more, and is preferably 100% by mass or less.

The grip force improving agent for rubber compositions of the present invention can contain any known additive for rubber compositions, in addition to the above-mentioned lignin degradation product (B). If desired, the lignin degradation product (B) may be diluted before use with an oil, an ester compound or an organic compound not detracting from the effect of the lignin degradation product (B) and so on.

EXAMPLES

Preparation Examples, Examples and Comparative Examples are described below, in which the physical properties were measured and evaluated according to the following methods.

(1) Calculation of Aldehyde Yield of Lignin Degradation Product According to Alkaline Nitrobenzene Oxidation Method 70 mg of a lignin degradation product, a lignin-containing sample, 7 mL of an aqueous 2 M sodium hydroxide solution, and 0.4 mL of nitrobenzene were put into a 20-mL vial, and heated at 170° C. for 2.5 hours with stirring at 900 rpm. After the reaction, this was cooled, and extracted three times with 10 mL of diethyl ether to remove a nitrobenzene reduced product and excessive nitrobenzene. Concentrated hydrochloric acid was added to the remaining water layer to adjust a pH value thereof to 1, and the solution was further extracted three times with 10 mL of diethyl ether. The resultant diethyl ether extract was subjected to distillation under reduced pressure to obtain an oxidation mixture. The resultant oxidation mixture was diluted with 20 mL of dichloromethane in a measuring cylinder. Then, 2 mL of the dilute solution was filtered through a Millipore HVHP membrane (available from Millipore Japan, pore size: 0.45 μm) and subjected to gas chromatography (GC).

The conditions for the gas chromatography were as follows. That is, a GC apparatus (GC-2010 Plus available from Shimadzu Corporation) equipped with a column "Agilent J & W GC Column DB-5" (available from Agilent Technologies Inc.) was used under the following conditions: The amount of the lignin-containing sample was 1.0 μL, the helium flow rate was 14.1 mL/min, the injection port temperature was 300° C., and the split ratio was 10/1. The column temperature condition was held at 60° C. for 1 minute, raised up to 60 to 250° C. at a rate of 5° C./min, and held at 250° C. for 10 minutes. The quantitative determination was conducted using a calibration curve prepared with respect to a peak area based on a concentration of three aldehyde reagents including vanillin, syringaldehyde, and p-hydroxybenzaldehyde, thereby determining the three aldehyde yields in the lignin degradation product.

The aldehyde yield (% by mass) was calculated according to the following math formula (II), and defined as an index of a degree of lignin denaturation. It is expressed that the higher the aldehyde yield, the lower in denaturation the lignin degradation product.

$$\text{Aldehyde yield (mass \%)} = (\text{Aldehyde yield of sum of aldehyde amounts of vanillin, syringaldehyde, and p-hydroxybenzaldehyde})/(\text{Lignin mass in collected lignin degradation product}) \times 100 \quad (II)$$

(2) Calculation of Lignin Amount (Lignin Content) (Mass %) in Lignin Degradation Product The lignin content and the lignin mass in a lignin degradation product were calculated according to the following math formulae (III) and (IV).

$$\text{Lignin content (mass \%)} = [\{\text{Acid-insoluble lignin content (mass \%)}\} + \{\text{Acid-soluble lignin content ratio (mass \%)}\}] \quad (III)$$

$$\text{Lignin mass (g)} = [\{\text{Acid-insoluble lignin content (mass \%)}\} + \{\text{Acid-soluble lignin content (mass \%)}\}] \times [\{\text{Collected amount of lignin degradation product (on a dry basis) (g)}\}/100] \quad (IV)$$

Here, the acid-insoluble lignin content and the acid-soluble lignin content were calculated by the following methods.

(Calculation of Acid-Insoluble Lignin Content)

The acid-insoluble lignin content was calculated by subtracting the ash content in a crude acid-insoluble lignin according to the following math formula (V).

$$\text{Acid-insoluble lignin content (mass \%)} = \{\text{Crude acid-insoluble lignin content (mass \%)}\} \times [100 - \{\text{ash content (mass \%)}\}]/100 \quad (V)$$

(Calculation of Crude Acid-Insoluble Lignin Content)

A milled lignin degradation product was dried in vacuum at 60° C. 300 mg of this dried lignin degradation product was charged in a vial, 3 mL of 72% by mass sulfuric acid was added thereto, and the resultant mixture was properly stirred in a water bath at 30° C. for 1 hour. Thereafter, 84 mL of water was added thereto, and the resultant mixture was transferred into a pressure bottle and treated in an autoclave at 120° C. for 1 hour. Thereafter, the lignin degradation product was taken out before its temperature was dropped to 70° C. or lower, and subjected to suction filtration using a 1G-3 glass filter whose constant mass was previously measured. The filtrate (A) was stored, whereas the glass filter having a residue attached thereto was fully washed with water and then dried at 105° C. to measure the constant mass thereof, thereby determining the crude acid-insoluble lignin content (on a dry basis) according to the following math formula (VI).

Crude acid-insoluble lignin content (mass %)= [{Mass of lignin degradation product residue (g)}/{Collected amount of lignin degradation product (on a dry basis) (g)}]×100     (VI)

(Calculation of Ash Content)

The crude acid-insoluble lignin was transferred into a crucible whose constant mass was previously measured, held therein at 575° C. for 12 hours, and then cooled to measure the constant mass of the crucible and determine the mass of the sample after ashing. The ash content was calculated according to the following math formula (VII).

Ash content (mass %)=[{Mass of sample after ashing (g)}/{Collected amount of crude acid-insoluble lignin (on a dry basis) (g)}]×100     (VII)

(Calculation of Acid-Soluble Lignin Content)

The acid-soluble lignin was measured by the following method, from which the acid-soluble lignin content was calculated.

The filtrate (A) was sampled in a constant volume of 100 mL and measured for the absorbance thereof at 205 nm using a UV-Vis absorptiometer. At this time, the filtrate was properly diluted such that the absorbance thereof could be 0.3 to 0.8.

Acid-soluble lignin content (mass %)=d×v×(As−Ab)/(a×w)×100

Here, d: dilution ratio; v: constant volume (L) of filtrate; As: absorbance of sample solution; Ab: absorbance of blank solution; a: absorptivity coefficient of lignin; w: collected amount of sample (on a dry basis) (g).

As the absorptivity coefficient (a) of lignin, there was used a value of 110 L/g/cm described as a known average value in a reference document "Methods in Lignin Chemistry" supervised by Junzo Nakano & Gyosuke Iidzuka (published by UNI Publishing Co., Ltd., 1994).

<Measurement of Weight Average Molecular Weight of Lignin Degradation Product>

The molecular weight of a lignin degradation product was measured through gel permeation chromatography (hereafter also referred to as "GPC") under the following conditions.

[GPC Operation]

100 µL of a lignin-containing sample solution (1 mg/mL) was injected and analyzed. The molecular weight of the sample was calculated based on a calibration curve which had been previously prepared.

[GPC Conditions]

Apparatus: HLC-8120GPC (available from Tosoh Corporation)

Detector: RI detector

Separation column: Two columns of TSK-GEL α-M (available from Tosoh Corporation)

Guard column: TSKgel guardcolumn a (available from Tosoh Corporation)

Column temperature: 40° C.

Eluting solution: N,N-Dimethylformamide solution having 60 mmol/L of $H_3PO_4$ and 50 mmol/L of LiBr added thereto Flow rate of eluting solution: 1 mL/min Standard sample: Monodisperse polystyrene mixed solution [A-500 (molecular weight: $5.0×10^2$), F-10 (molecular weight: $9.64×10^4$), and F-850 (molecular weight: $8.42×10^6$), all of which are available from Tosoh Corporation; and those monodisperse polystyrenes available from Pressure Chemical (molecular weights: $4.0×10^3$, $3.0×10^4$, and $9.29×10^5$)

(4) Measurement of Sulfur Content in Lignin Degradation Product

The sulfur content in a lignin degradation product was measured and calculated by ion chromatography using an automated combustion system as mentioned below.

[Analysis Operation]

About 0.02 to 0.05 g of a lignin degradation product was collected in a combustion board, and tungsten oxide was added thereto. A combustion operation was conducted with an automated combustion system AQF-100 (available from Mitsubishi Chemical Corporation), and a sulfate ion was collected with an absorption solution (5 mL of 900 ppm hydrogen peroxide solution). The absorption solution was diluted with ion-exchanged water to make up constant 50 mL volume, thereby preparing a test solution. The test solution was measured by the ion chromatography, and the content of sulfur in the sample (conversion from sulfate ion: 0.3338) was calculated from the calibration curve.

[Operation Conditions of Combustion System]

Apparatus: Automated combustion system AQF-100 (available from Mitsubishi Chemical Corporation)

Maximum combustion temperature: 1,000° C.

Gas flow rate: Argon/oxygen: 200 mL/min, oxygen: 400 mL/min

Gas flow rate of water supply unit: Argon: 150 mL/min

[Ion Chromatography Operation Conditions]

Apparatus: ICS-1500 (available from DIONEX Corporation)

Detector: Conductivity detector

Separation column: IonPac AS12A (available from DIONEX Corporation)

Guard column: IonPac AG12A (available from DIONEX Corporation)

Eluting solution: Mixed solution of 2.7 mmol/L sodium carbonate and 0.3 mmol/L sodium hydrogen carbonate (1/1)

Flow rate of eluting solution: 1.5 mL/min,

Suppressor: AERS 500 4-mm (recycle mode) (available from Thermo Fisher Scientific Inc.)

Preparation Example 1: Lignin Degradation Product 1 (Low Denatured)

[Step (A-1)]

Bagasse as a herbaceous biomass in a dry mass of 30 g was placed in a glass bottle, and a 1.6% by mass sodium hydroxide aqueous solution was added thereto such that the solid component concentration was 10% by mass. The glass bottle was heated in a constant-temperature bath at 95° C. for 6 hours (H-factor: 3.5).

[Step (A-2)]

The reaction product obtained in the step (A-1) was filtered under reduced pressure using a 400-mesh SUS mesh and a Nutsche filter. The residue was washed with 300 mL of ion-exchanged water at 90° C. to obtain a filtrate.

[Step (A-3)]

1.0 M hydrochloric acid was added to the filtrate to make it have pH 2. The resultant suspension was centrifuged ("CR 20GIII", available from Hitachi Koki Co., Ltd., at 10,000 rpm for 20 minutes). The supernatant was removed, 300 mL of ion-exchanged water was added to the residue, and after stirring, the resultant was again centrifuged, followed by water washing. The water washing was conducted two times, and the resultant precipitate was freeze-dried.

Acetone was added to the resultant lignin, stirred for 3 hours and extracted with solvent. Subsequently, this was subjected to solid-liquid separation using filter paper "Filter Paper No. 2" (available from Toyo Roshi Kaisha, Ltd.). Acetone was evaporated away under reduced pressure from the filtrate to obtain a lignin degradation product 1.

The aldehyde yield of the resultant lignin degradation product 1 according to an alkaline nitrobenzene oxidation method was 27.6% by mass, the weight average molecular weight thereof was 1,700, and the sulfur content was 0.085% by mass. The lignin content in the lignin degradation product 1 was 93% by mass.

Preparation Example 2: Lignin Degradation Product 2 (Low Denatured)

A lignin degradation product 2 was obtained under the same condition as in Preparation Example 1 except that, in the step (A-3) in Preparation Example 1, the extraction solvent was changed to a mixed solvent of acetone/methanol (80/20 by volume) and the acetone/methanol mixed solvent was used. The aldehyde yield of the resultant lignin degradation product 2 according to an alkaline nitrobenzene oxidation method was 24.3% by mass, the weight average molecular weight thereof was 4,800, and the sulfur content was 0.056% by mass. The lignin content in the lignin degradation product 2 was 90% by mass.

Preparation Example 3: Lignin Degradation Product 3 (Low Denatured) (Pretreatment)

Bagasse (strained lees of sugar cane; water content: 7.0% by mass) as a herbaceous biomass was placed in a vacuum dryer "VO-320" (available from Advantech Toyo Kaisha, Ltd.) and dried under reduced pressure in a nitrogen flow for 2 hours, thereby obtaining a dried bagasse having a water content of 2.0% by mass, a holocellulose content of 71.3% by mass, and a lignin content of 22.8% by mass.

100 g of the resultant dry bagasse and granular sodium hydroxide "TOSOH PEARL" (available from Tosoh Corporation) having a particle diameter of 0.7 mm in an amount of 4.4 g (corresponding to 0.25 mol per mol of anhydroglucose unit (AGU) constituting the holocellulose) were charged into a batch-type vibration mill "MB-1" (available from Chuo Kakohki Co., Ltd.; total container capacity: 3.5 L; filled with SUS304-made rods with a circular shape in section having a diameter of ϕ30 mm and a length of 218 mm, at a filling ratio of 57% by volume), and subjected to a milling treatment for 2 hours, thereby obtaining a milled bagasse (cellulose I-type crystallinity: 14%; average particle diameter: 56.6 μm). The resultant milled bagasse in an amount of 100 g (expressed in terms of a dry raw material from which the basic compound was removed) was neutralized with 1.0 M hydrochloric acid.

[Step (B-1)]

100 g of the resultant milled bagasse was put into 2.0 L of a 100 mM acetic acid buffer solution (pH: 5.0), and 20 mL of a cellulose/hemicellulase preparation "Cellic CTec 2" (available from Novozymes A/S) was added thereto. The resultant mixture was held at 50° C. while stirring at 600 rpm to undergo enzymatic saccharification. After 24 hours, the reaction was terminated, and the resultant reaction solution was centrifuged to separate the solution into a supernatant and a saccharification residue. The saccharification residue was subjected to washing and centrifugation repeatedly, followed by freeze-drying.

[Step (B-2)]

The resultant saccharification residue (absolute dry mass: 250 mg) was charged into a reaction vessel (capacity: 5 mL), and 4.8 g of a mixed solvent of acetone/water (mass ratio: 50/50) and 240 μL of hydrochloric acid (concentration: 1.0 M) were added thereto. Then, the reaction vessel was hermetically closed, and the contents of the reaction vessel were subjected to microwave heating at 160° C. and 1.6 MPa for 30 minutes while stirring at 900 rpm using a microwave heater "Initiator 60" (available from Biotage Japan Ltd.), thereby obtaining a heat treatment solution.

[Step (B-3)]

The heat treatment solution obtained in the step (B-2) was centrifuged to separate the solution into an extraction solution and a residue. The resultant residue was washed with acetone, water, and a mixed solvent of acetone/water until an extraction solution therefrom became transparent. The extraction solutions obtained through the centrifugation and washing were gathered, to which was then added 240 μL of 1.0 M sodium hydroxide to undergo neutralization, and the solvent included in the extraction solution was then distilled off under reduced pressure. The resultant solid was again washed with water, and the obtained water-insoluble component was dried under reduced pressure at room temperature, thereby obtaining a lignin degradation product 3. The aldehyde yield rate of the lignin degradation product 3 by alkaline nitrobenzene oxidation was 20.1% by mass. The weight average molecular weight thereof was 9,300. The sulfur content in the lignin degradation product 3 was 0.066% by mass. The lignin content in the lignin degradation product 3 was 95% by mass.

Preparation Example 4: Lignin Degradation Product 4 (Low Denatured)

Using a mini-speed mill (MS-05, available from Labonext Corporation), eucalyptus wood chips (available from Ariyoshi Corporation) were milled for 30 seconds, then kept stopped for 30 seconds, and again milled for 30 seconds, then 20 g (absolute dry mass) of the milled product, 200 mL of acetic acid and 12 mL of 1 M sulfuric acid (available from Wako Pure Chemical Industries, Ltd.) were put into an eggplant flask, the liquid phase was uniformly mixed, and then left to stand at room temperature for 1 weak. Next, this was refluxed at 120° C. for 1 hour. Next, 15 mL of 2 M NaOH (available from Wako Pure Chemical Industries, Ltd.) was added, then the liquid phase was uniformly mixed and subjected to liquid-solid separation through suction filtration using filter paper (Qualitative Filter No. 2 having a diameter of 90 mm, available from Advantech Co., Ltd.) and a Buchner funnel.

The filtration residue remaining on the filter paper was washed with 40 mL of acetic acid (available from Wako Pure Chemical Industries, Ltd.) added thereto, and the washing was added to the filtrate. The filtrate was put into 2 L of ion-exchanged water and the resultant suspension was centrifuged using a centrifuge (CR 20GIII, available from Hitachi Koki Co., Ltd.), at 100 r/min for 20 minutes to obtain a cake 1. The cake 1 was dispersed in ion-exchanged water added thereto in an amount of 2 times by mass the cake 1 and then again centrifuged under the above-mentioned condition to obtain a cake 2. The cake 2 was freeze-dried to be a powder, acetone was added thereto, stirred for 3 hours, and then subjected to solid-liquid separation through filter paper (Qualitative Filter No. 2, available from Advantech Co., Ltd.). Acetone was evaporated away from the filtrate under reduced pressure to obtain a lignin degradation product 4.

The aldehyde yield rate of the resultant lignin degradation product 4 by alkaline nitrobenzene oxidation was 13.1% by mass. The weight average molecular weight thereof was 9,800. The sulfur content was 0.061% by mass. The lignin content in the lignin degradation product 4 was 79% by mass.

Examples 1 to 14 and Comparative Examples 1 to 11

(1) Preparation of Unvulcanized Rubber Composition

In each of compounding compositions shown in Tables 1 to 8, the other components than zinc white, sulfur and the vulcanization accelerator were kneaded in a 100-mL closed-type mixer (Labo Plastomill (R100) available from Toyo Seiki Seisaku-sho, Ltd.) for 3 to 6 minutes, and when the temperature thereof reached 155° C., the kneaded mixture was discharged to be a rubber composition. Here, after the rubber composition was cooled to 50° C. or lower, zinc white, sulfur and the vulcanization accelerator were subsequently added to the rubber composition and kneaded for 3 minutes, and when the temperature thereof reached 110° C. to 125° C., the kneaded mixture was discharged to be an unvulcanized rubber composition.

(2) Preparation of Vulcanized Rubber Test Piece for Measurement of Frictional Force Index The unvulcanized rubber composition prepared in the above (1) was put between two SUS plates together with a metal-made frame having a thickness of 1.6 mm and 14.3 cm×10.3 cm and vulcanized at 160° C. to prepare a vulcanized rubber test piece. Using a super straight cutter available from Dumbbell Co., Ltd., the resultant vulcanized rubber sheet was cut into reed-shaped test pieces of 1.3 cm×6.3 cm.

As for the vulcanization time for the test pieces, a vulcanization time (T90) of the unvulcanized rubber at 160° C. was determined in conformity with the vulcanization test with a vibration type vulcanization machine described in JIS K6300-2, and the vulcanization was conducted for a time calculated by multiplying T90 by 1.5.

(3) Calculation of Maximum Static Frictional Force Index and Average Kinematic Frictional Force Index Using a static/kinematic friction measuring device "TL201Ts" available from Trinity-Lab. Inc., and using a table sliding-type driving unit, the rubber test pieces were tested.

At the test piece fixing site of the measuring unit of the static/kinematic friction measuring device, the vulcanized rubber test piece to be tested was fixed using a double-face adhesive tape (intense type) "Nicetac" (registered trademark) available from Nichiban Co., Ltd. At this time, the marginal parts at both ends of the rubber test piece were fixed to both sides of the measuring unit in such a manner that the measuring surface and the ground contact surface (underside of the measuring unit) could be 1.3 cm×2.0 cm. As the measuring surface, SUS303 of 9.0 cm×5.5 cm×0.7 cm was used. The SUS plate was fixed in a liquid vat provided on a slide table. For fixing the plate, a double-face adhesive tape (intense type) "Nicetac" (registered trademark) available from Nichiban Co., Ltd. was used.

The maximum static frictional force index and the average kinematic frictional force index were measured at a measuring velocity of 10 mm/sec, under a vertical load of 100 g and a moving distance of 1 cm. The maximum static frictional force index and the average kinematic frictional force index of each test piece are as follows. A rubber composition having the same components as those of the present invention except the lignin degradation product (the rubber composition of Comparative Example 1) was tested to measure the maximum static frictional force index and the average kinematic frictional force index thereof, which was individually referred to as 100. According to the following math formula (VIII), a relative value of the maximum static frictional force index and the average kinematic frictional force index of each test piece was calculated. A larger frictional force index means that the grip force of the rubber sample is higher.

$$\text{Frictional force index} = [(\text{frictional force})/(\text{frictional force of Comparative Example 1})] \times 100$$

In Table 1, Comparative Example 1 was given 100 for calculation; in Table 2, Comparative Example 2 was given 100; in Table 3, Comparative Example 6 was given 100; in Table 4, Comparative Example 7 was given 100; in Table 5, Comparative Example 8 was given 100; in Table 6, Comparative Example 9 was given 100; in Table 7, Comparative Example 10 was given 100; and in Table 8, Comparative Example 11 was given 100.

In the case where each sample was tested in a dry state and the frictional force was calculated according to the above math formula (VIII), the results are shown as Dry; while in the case where each sample was tested in a wet state, for which the liquid vat was filled with ion-exchanged water and the SUS plates and the rubber test piece were kept immersed in the ion-exchanged water, and where the frictional force was calculated according to the above math formula (VIII), the results are shown as Wet. The results are given in Tables 1 to 8.

The details of the constituent components in the tables are as follows.

*1: Solution-polymerized styrene-butadiene rubber, "Nipol (registered trademark) NS210" available from Zeon Corporation

*2: Emulsion-polymerized styrene-butadiene rubber, "Nipol (registered trademark) 1502" available from Zeon Corporation

*3: Available from Tokyo Chemical Industry Co., Ltd., lignin (dealkalizated) "L0045", weight average molecular weight: 14,400, lignin content: 84% by mass, aldehyde yield: 5.5% by mass, sulfur content: 4.5% by mass

*4: Available from Nacalai Tesque, Inc., lignin "20453-02", lignin content: 60% by mass, aldehyde yield: 8.7% by mass, weight average molecular weight: 11,000, sulfur content: 3.5% by mass

*5: Available from Sigma Aldrich Corporation, sodium lignosulfonate "471038-100G", weight average molecular weight: 52,000, lignin content: 85% by mass, aldehyde yield: 11% by mass, sulfur content: 6.0% by mass

*6: Aromatic secondary amine-based anti-aging agent, N-phenyl-N-(1,3-dimethylbutyl)-p-phenylenediamine, "Nocrac 6C" available from Ouchi Shinko Chemical Industrial Co., Ltd.

*7: Bisphenol-based anti-aging agent, 4,4t-butylidenebis (3-methyl-6-tert-butylphenol), "Nocrac NS-30" available from Ouchi Shinko Chemical Industrial Co., Ltd.

*8: Phosphite-based anti-aging agent, tris(2,4-di-tert-butylphenyl) phosphite, "JP-650" available from Johoku Chemical Co., Ltd.

*9: Hindered phenol-based anti-aging agent, stearyl 3-(3, 5-di-tert-butyl-4-hydroxyphenyl)propionate, "Irganox 1076" available from BASF SE

*20: Bisphenol-based anti-aging agent, 2,2'-methylenebis (4-methyl-6-tert-butylphenol), special grade chemical available from Wako Pure Chemical Industries, Ltd.

*21: Monophenol-based anti-aging agent, 2,6-di-tert-butyl-4-methylphenol (BHT), special grade chemical available from Wako Pure Chemical Industries, Ltd.

*22: Quinoline-based anti-aging agent, 2,2,4-trimethyl-1,2-dihydroquinoline polymer, "Nocrac 224" available from Ouchi Shinko Chemical Industrial Co., Ltd.

*23: Special wax-based anti-aging agent, selected special wax, "Sunnoc" available from Ouchi Shinko Chemical Industrial Co., Ltd.

*10: Precipitation-process silica (white carbon), "Nipsil AQ" available from Tosoh Silica Corporation

*11: Carbon black, "Seast 3" available from Tokai Carbon Co., Ltd.

*12: Bis(3-triethoxysilylpropyl) tetrasulfide, "Si69" available from Degussa AG

*13: 2-(2'Hydroxy-5'-methylphenyl)benzotriazole, "JF-77" available from Johoku Chemical Co., Ltd.

*14: "Lunac S-70V" available from Kao Corporation

*15: Naphthenic process oil, "SUNTHENE 410" available from Japan Sun Oil Company, Ltd.

*16: "Zinc Oxide, Wako Special Grade Chemical" available from Wako Pure Chemical Industries, Ltd.

*17: "Sulfur powder for chemical use", available from Wako Pure Chemical Industries, Ltd.

*18: Sulfenamide-based vulcanization accelerator, N-tert-butyl-2-benzothiazyl sulfenamide, "Sanceler NS", available from Sanshin Chemical Industry Co., Ltd.

*19: Natural rubber, "No. RSS3"

TABLE 1

| | | | Example 1 | Example 2 | Comparative Example 1 |
|---|---|---|---|---|---|
| Formulation of Rubber Composition (part by mass) | Rubber Component (A) | S-SBR *1 | 100 | 100 | 100 |
| | Lignin Degradation Product (B) | Lignin Degradation Product 1 | 4 | 10 | — |
| | Anti-aging Agent (C) | Nocrac 6C *6 (aromatic secondary amine compound) | 1 | 1 | 1 |
| | Filler (D) | Silica *10 | 40 | 40 | 40 |
| | Silane Coupling Agent (E) *12 | | 4 | 4 | 4 |
| | Additives | Stearic Acid *14 | 1 | 1 | 1 |
| | | Process Oil *15 | 5 | 5 | 5 |
| | | Zinc white *16 | 3 | 3 | 3 |
| | Vulcanizing Agent | Sulfur *17 | 2 | 2 | 2 |
| | Vulcanization Accelerator | Sanceler NS *18 | 1.5 | 1.5 | 1.5 |
| Constitution of Rubber Composition | | Total Amount (part by mass) | 161.5 | 167.5 | 157.5 |
| | | Content of Rubber (A) (% by mass) | 61.9 | 59.7 | 63.5 |
| | | Mass Ratio (B)/(A) *a | 0.037 | 0.093 | — |
| | | Mass Ratio (C)/(A) | 0.01 | 0.01 | 0.01 |
| | | Mass Ratio (C)/(B) *a | 0.27 | 0.11 | — |
| | | Mass Ratio (D)/(B) *a | 10.75 | 4.30 | — |
| Evaluation Results | Dry | Maximum Static Frictional Force Index | 138 | 140 | 100 |
| | | Average Kinematic Frictional Force Index | 124 | 124 | 100 |
| | Wet | Maximum Static Frictional Force Index | 109 | 113 | 100 |
| | | Average Kinematic Frictional Force Index | 132 | 119 | 100 |

*a In calculating the mass ratio, the lignin amount in the lignin degradation product was taken as the amount of the lignin degradation product (B).

TABLE 2

| | | | Example 3 | Example 4 | Example 5 | Example 6 | Comparative Example 2 |
|---|---|---|---|---|---|---|---|
| Formulation of Rubber Composition (part by mass) | Rubber Component (A) | E-SBR *2 | 100 | 100 | 100 | 100 | 100 |
| | Lignin Degradation Product (B) | Lignin Degradation Product 1 | 4 | — | — | — | — |
| | | Lignin Degradation Product 2 | — | 4 | — | — | — |
| | | Lignin Degradation Product 3 | — | — | 4 | — | — |
| | | Lignin Degradation Product 4 | — | — | — | 4 | — |
| | Commercial Product Lignin (high denatured) | Commercial Product Lignin (TCI) *3 | — | — | — | — | — |
| | | Commercial Product Lignin (NAC) *4 | — | — | — | — | — |
| | | Commercial Product Lignin (LSA) *5 | — | — | — | — | — |
| | Anti-aging Agent (C) | Nocrac NS-30 *7 (bisphenol compound) | 1 | 1 | 1 | 1 | 1 |
| | Filler (D) | Silica *10 | 40 | 40 | 40 | 40 | 40 |
| | Silane Coupling Agent (E) *12 | | 4 | 4 | 4 | 4 | 4 |
| | Additives | Stearic Acid *14 | 1 | 1 | 1 | 1 | 1 |
| | | Process Oil *15 | 5 | 5 | 5 | 5 | 5 |
| | | Zinc white *16 | 3 | 3 | 3 | 3 | 3 |
| | Vulcanizing Agent | Sulfur *17 | 2 | 2 | 2 | 2 | 2 |
| | Vulcanization Accelerator | Sanceler NS *18 | 1.5 | 1.5 | 1.5 | 1.5 | 1.5 |
| Constitution of Rubber Composition | | Total Amount (part by mass) | 161.5 | 161.5 | 161.5 | 161.5 | 157.5 |
| | | Content of Rubber (A) (% by mass) | 61.9 | 61.9 | 61.9 | 61.9 | 63.5 |
| | | Mass Ratio (B)/(A) *a | 0.037 | 0.036 | 0.038 | 0.032 | — |
| | | Mass Ratio (C)/(A) | 0.01 | 0.01 | 0.01 | 0.01 | 0.01 |

TABLE 2-continued

|  |  |  |  |  |  |  |  |
|---|---|---|---|---|---|---|---|
| Evaluation Results | | Mass Ratio (C)/(B) *a | 0.27 | 0.28 | 0.26 | 0.32 | — |
| | | Mass Ratio (D)/(B) *a | 10.75 | 11.12 | 10.53 | 12.66 | — |
| | Dry | Maximum Static Frictional Force Index | 145 | 116 | 120 | 108 | 100 |
| | | Average Kinematic Frictional Force Index | 152 | 132 | 121 | 97 | 100 |
| | Wet | Maximum Static Frictional Force Index | 102 | 104 | 109 | 125 | 100 |
| | | Average Kinematic Frictional Force Index | 115 | 99 | 104 | 116 | 100 |

|  |  |  |  | Comparative Example 3 | Comparative Example 4 | Comparative Example 5 |
|---|---|---|---|---|---|---|
| Formulation of Rubber Composition (part by mass) | Rubber Component (A) | | E-SBR *2 | 100 | 100 | 100 |
| | Lignin Degradation Product (B) | | Lignin Degradation Product 1 | — | — | — |
| | | | Lignin Degradation Product 2 | — | — | — |
| | | | Lignin Degradation Product 3 | — | — | — |
| | | | Lignin Degradation Product 4 | — | — | — |
| | Commercial Product Lignin (high denatured) | | Commercial Product Lignin (TCI) *3 | 4 | — | — |
| | | | Commercial Product Lignin (NAC) *4 | — | 4 | — |
| | | | Commercial Product Lignin (LSA) *5 | — | — | 4 |
| | Anti-aging Agent (C) | | Nocrac NS-30 *7 (bisphenol compound) | 1 | 1 | 1 |
| | Filler (D) | | Silica *10 | 40 | 40 | 40 |
| | | Silane Coupling Agent (E) *12 | | 4 | 4 | 4 |
| | Additives | | Stearic Acid *14 | 1 | 1 | 1 |
| | | | Process Oil *15 | 5 | 5 | 5 |
| | | | Zinc white *16 | 3 | 3 | 3 |
| | Vulcanizing Agent | | Sulfur *17 | 2 | 2 | 2 |
| | Vulcanization Accelerator | | Sanceler NS *18 | 1.5 | 1.5 | 1.5 |
| Constitution of Rubber Composition | | | Total Amount (part by mass) | 161.5 | 161.5 | 161.5 |
| | | | Content of Rubber (A) (% by mass) | 61.9 | 61.9 | 61.9 |
| | | | Mass Ratio (B)/(A) *a | — | — | — |
| | | | Mass Ratio (C)/(A) | 0.01 | 0.01 | 0.01 |
| | | | Mass Ratio (C)/(B) *a | — | — | — |
| | | | Mass Ratio (D)/(B) *a | — | — | — |
| Evaluation Results | Dry | | Maximum Static Frictional Force Index | 92 | 96 | 105 |
| | | | Average Kinematic Frictional Force Index | 94 | 93 | 104 |
| | Wet | | Maximum Static Frictional Force Index | 77 | 77 | 77 |
| | | | Average Kinematic Frictional Force Index | 74 | 95 | 81 |

*a: In calculating the mass ratio, the lignin amount in the lignin degradation product was taken as the amount of the lignin degradation product (B).

TABLE 3

|  |  |  | Example 7 | Comparative Example 6 |
|---|---|---|---|---|
| Formulation of Rubber Composition (part by mass) | Rubber Component (A) | E-SBR *2 | 100 | 100 |
| | Lignin Degradation Product (B) | Lignin Degradation Product 1 | 10 | — |
| | Anti-aging Agent (C) | Nocrac NS-30 *7 (bisphenol compound) | 5 | 5 |
| | Filler (D) | Silica *10 | 40 | 40 |
| | | Silane Coupling Agent (E) *12 | 4 | 4 |
| | Additives | Stearic Acid *14 | 1 | 1 |
| | | Process Oil *15 | 5 | 5 |
| | | Zinc white *16 | 3 | 3 |
| | Vulcanizing Agent | Sulfur *17 | 2 | 2 |
| | Vulcanization Accelerator | Sanceler NS *18 | 1.5 | 1.5 |
| Constitution of Rubber Composition | | Total Amount (part by mass) | 171.5 | 161.5 |
| | | Content of Rubber (A) (% by mass) | 58.3 | 61.9 |
| | | Mass Ratio (B)/(A) *a | 0.093 | — |
| | | Mass Ratio (C)/(A) | 0.05 | 0.05 |
| | | Mass Ratio (C)/(B) *a | 0.54 | — |
| | | Mass Ratio (D)/(B) *a | 4.30 | — |

TABLE 3-continued

|  |  |  | Example 7 | Comparative Example 6 |
|---|---|---|---|---|
| Evaluation Results | Dry | Maximum Static Frictional Force Index | 107 | 100 |
|  |  | Average Kinematic Frictional Force Index | 105 | 100 |
|  | Wet | Maximum Static Frictional Force Index | 107 | 100 |
|  |  | Average Kinematic Frictional Force Index | 116 | 100 |

*a In calculating the mass ratio, the lignin amount in the lignin degradation product was taken as the amount of the lignin degradation product (B).

TABLE 4

|  |  |  | Example 8 | Comparative Example 7 |
|---|---|---|---|---|
| Formulation of Rubber Composition (part by mass) | Rubber Component (A) | E-SBR *2 | 100 | 100 |
|  | Lignin Degradation Product (B) | Lignin Degradation Product 1 | 4 | — |
|  | Anti-aging Agent (C) | JP650 (phosphite ester-based) *8 | 0.3 | 0.3 |
|  |  | Irganox 1076 (hindered phenol compound) *9 | 0.3 | 0.3 |
|  | Filler (D) | Silica *10 | 45 | 45 |
|  | Silane Coupling Agent (E) *12 |  | 4.5 | 4.5 |
|  | UV Absorbent | JF-77 *13 | 0.3 | 0.3 |
|  | Additives | Stearic Acid *14 | 1 | 1 |
|  |  | Process Oil *15 | 5 | 5 |
|  |  | Zinc white *16 | 3 | 3 |
|  | Vulcanizing Agent | Sulfur *17 | 2 | 2 |
|  | Vulcanization Accelerator | Sanceler NS *18 | 1.5 | 1.5 |
| Constitution of Rubber Composition |  | Total Amount (part by mass) | 166.9 | 162.9 |
|  |  | Content of Rubber (A) (% by mass) | 59.9 | 61.4 |
|  |  | Mass Ratio (B)/(A) *a | 0.037 | — |
|  |  | Mass Ratio (C)/(A) | 0.006 | 0.006 |
|  |  | Mass Ratio (C)/(B) *a | 0.16 | — |
|  |  | Mass Ratio (D)/(B) *a | 12.1 | — |
| Evaluation Results | Dry | Maximum Static Frictional Force Index | 119 | 100 |
|  |  | Average Kinematic Frictional Force Index | 130 | 100 |
|  | Wet | Maximum Static Frictional Force Index | 96 | 100 |
|  |  | Average Kinematic Frictional Force Index | 97 | 100 |

*a In calculating the mass ratio, the lignin amount in the lignin degradation product was taken as the amount of the lignin degradation product (B).

TABLE 5

|  |  |  | Example 9 | Example 10 | Comparative Example 8 |
|---|---|---|---|---|---|
| Formulation of Rubber Composition (part by mass) | Rubber Component (A) | E-SBR *2 | 100 | 100 | 100 |
|  | Lignin Degradation Product (B) | Lignin Degradation Product 1 | 4 | 10 | — |
|  | Anti-aging Agent (C) | Nocrac 6C *6 (aromatic secondary amine compound) | 0.5 | 0.5 | 0.5 |
|  | Filler (D) | Carbon black *11 | 40 | 40 | 40 |
|  | Additives | Stearic Acid *14 | 1 | 1 | 1 |
|  |  | Process Oil *15 | 5 | 5 | 5 |
|  |  | Zinc white *16 | 3 | 3 | 3 |
|  | Vulcanizing Agent | Sulfur *17 | 2 | 2 | 2 |
|  | Vulcanization Accelerator | Sanceler NS *18 | 1.5 | 1.5 | 1.5 |
| Constitution of Rubber Composition |  | Total Amount (part by mass) | 157 | 163 | 153 |
|  |  | Content of Rubber (A) (% by mass) | 63.7 | 61.3 | 65.4 |
|  |  | Mass Ratio (B)/(A) *a | 0.037 | 0.093 | — |
|  |  | Mass Ratio (C)/(A) | 0.005 | 0.005 | 0.005 |
|  |  | Mass Ratio (C)/(B) *a | 0.13 | 0.05 | — |
|  |  | Mass Ratio (D)/(B) *a | 10.75 | 4.3 | — |
| Evaluation Results | Dry | Maximum Static Frictional Force Index | 108 | 104 | 100 |
|  |  | Average Kinematic Frictional Force Index | 106 | 108 | 100 |
|  | Wet | Maximum Static Frictional Force Index | 122 | 111 | 100 |
|  |  | Average Kinematic Frictional Force Index | 131 | 125 | 100 |

*a In calculating the mass ratio, the lignin amount in the lignin degradation product was taken as the amount of the lignin degradation product (B).

TABLE 6

|  |  |  | Example 11 | Comparative Example 9 |
|---|---|---|---|---|
| Formulation of Rubber Composition (part by mass) | Rubber Component (A) | E-SBR *2 | 100 | 100 |
|  | Lignin Degradation Product (B) | Lignin Degradation Product 1 | 2 | — |
|  | Anti-aging Agent (C) | (bisphenol-based) *20 | 0.3 | 0.3 |
|  |  | BHT (monophenol compound) *21 | 0.3 | 0.3 |
|  | Filler (D) | Silica *10 | 40 | 45 |
|  |  | Silane Coupling Agent (E) *12 | 4 | 4.5 |
|  | Additives | Stearic Acid *14 | 1 | 1 |
|  |  | Process Oil *15 | 5 | 5 |
|  |  | Zinc white *16 | 3 | 3 |
|  | Vulcanizing Agent | Sulfur *17 | 2 | 2 |
|  | Vulcanization Accelerator | Sanceler NS *18 | 1.5 | 1.5 |
| Constitution of Rubber Composition |  | Total Amount (part by mass) | 159.1 | 162.6 |
|  |  | Content of Rubber (A) (% by mass) | 62.9 | 61.5 |
|  |  | Mass Ratio (B)/(A) *a | 0.02 | — |
|  |  | Mass Ratio (C)/(A) | 0.01 | 0.01 |
|  |  | Mass Ratio (C)/(B) *a | 0.32 | — |
|  |  | Mass Ratio (D)/(B) *a | 21.5 | — |
| Evaluation Results | Dry | Maximum Static Frictional Force Index | 81 | 100 |
|  |  | Average Kinematic Frictional Force Index | 99 | 100 |
|  | Wet | Maximum Static Frictional Force Index | 115 | 100 |
|  |  | Average Kinematic Frictional Force Index | 109 | 100 |

*a In calculating the mass ratio, the lignin amount in the lignin degradation product was taken as the amount of the lignin degradation product (B).

TABLE 7

|  |  |  | Example 12 | Comparative Example 10 |
|---|---|---|---|---|
| Formulation of Rubber Composition (part by mass) | Rubber Component (A) | E-SBR *2 | 75 | 75 |
|  |  | Natural Rubber *19 | 25 | 25 |
|  | Lignin Degradation Product (B) | Lignin Degradation Product 1 | 2 | — |
|  | Anti-aging Agent (C) | Nocrac 224 (quinolone compound) *22 | 0.5 | 0.5 |
|  | Filler (D) | Silica *10 | 40 | 40 |
|  |  | Silane Coupling Agent (E) *12 | 4 | 4 |
|  | Additives | Stearic Acid *14 | 1 | 1 |
|  |  | Process Oil *15 | 5 | 5 |
|  |  | Zinc white *16 | 3 | 3 |
|  | Vulcanizing Agent | Sulfur *17 | 2 | 2 |
|  | Vulcanization Accelerator | Sanceler NS *18 | 1.5 | 1.5 |
| Constitution of Rubber Composition |  | Total Amount (part by mass) | 159 | 157 |
|  |  | Content of Rubber (A) (% by mass) | 62.9 | 63.7 |
|  |  | Mass Ratio (B)/(A) *a | 0.02 | — |
|  |  | Mass Ratio (C)/(A) | 0.01 | 0.01 |
|  |  | Mass Ratio (C)/(B) *a | 0.27 | — |
|  |  | Mass Ratio (D)/(B) *a | 21.5 | — |
| Evaluation Results | Dry | Maximum Static Frictional Force Index | 102 | 100 |
|  |  | Average Kinematic Frictional Force Index | 100 | 100 |
|  | Wet | Maximum Static Frictional Force Index | 114 | 100 |
|  |  | Average Kinematic Frictional Force Index | 104 | 100 |

*a In calculating the mass ratio, the lignin amount in the lignin degradation product was taken as the amount of the lignin degradation product (B).

TABLE 8

|  |  |  | Example 13 | Example 14 | Comparative Example 11 |
|---|---|---|---|---|---|
| Formulation of Rubber Composition (part by mass) | Rubber Component (A) | E-SBR *2 | 75 | 75 | 75 |
|  |  | Natural Rubber *19 | 25 | 25 | 25 |
|  | Lignin Degradation Product (B) | Lignin Degradation Product 1 | 2 | 4 | — |
|  | Anti-aging Agent (C) | Sunnoc (special wax-based) *23 | 0.5 | 0.5 | 0.5 |
|  | Filler (D) | Silica *10 | 40 | 40 | 40 |
|  |  | Silane Coupling Agent (E) *12 | 4 | 4 | 4 |
|  | Additives | Stearic Acid *14 | 1 | 1 | 1 |
|  |  | Process Oil *15 | 5 | 5 | 5 |
|  |  | Zinc white *16 | 3 | 3 | 3 |

TABLE 8-continued

|  |  |  | Example 13 | Example 14 | Comparative Example 11 |
|---|---|---|---|---|---|
|  | Vulcanizing Agent | Sulfur *17 | 2 | 2 | 2 |
|  | Vulcanization Accelerator | Sanceler NS *18 | 1.5 | 1.5 | 1.5 |
| Constitution of Rubber Composition |  | Total Amount (part by mass) | 159 | 161 | 157 |
|  |  | Content of Rubber (A) (% by mass) | 62.9 | 62.1 | 63.7 |
|  |  | Mass Ratio (B)/(A) *a | 0.019 | 0.037 | — |
|  |  | Mass Ratio (C)/(A) | 0.01 | 0.01 | 0.01 |
|  |  | Mass Ratio (C)/(B) *a | 0.27 | 0.13 | — |
|  |  | Mass Ratio (D)/(B) *a | 21.5 | 10.8 | — |
| Evaluation Results | Dry | Maximum Static Frictional Force Index | 144 | 126 | 100 |
|  |  | Average Kinematic Frictional Force Index | 148 | 124 | 100 |
|  | Wet | Maximum Static Frictional Force Index | 122 | 107 | 100 |
|  |  | Average Kinematic Frictional Force Index | 146 | 137 | 100 |

*a In calculating the mass ratio, the lignin amount in the lignin degradation product was taken as the amount of the lignin degradation product (B).

From Tables 1 to 8, it is known that the rubber composition of the present invention has a large maximum static frictional force index and a large average kinematic frictional force index in any of a dry case and a wet case and exhibits an excellent grip force.

INDUSTRIAL APPLICABILITY

The rubber composition of the present invention exhibits an excellent grip force irrespective of road surface conditions, and is therefore especially useful for shoe soles, etc.

The invention claimed is:

1. A rubber composition comprising
(A) 100 parts by mass of a rubber component,
(B) 1 part by mass to 30 parts by mass of a lignin degradation product having an aldehyde yield, according to an alkaline nitrobenzene oxidation method, of 12% by mass or more, and
(C) 0.1 part by mass to 10 parts by mass of an anti-aging agent.

2. The rubber composition according to claim 1, wherein the weight average molecular weight of the lignin degradation product (B) is 500 or more and 15,000 or less.

3. The rubber composition according to claim 1, wherein the anti-aging agent (C) comprises one or more selected from the group consisting of a bisphenol compound, an aromatic secondary amine compound, a hindered phenol compound, a monophenol compound, a phosphite compound, a polyphenol compound, a benzimidazole compound, a dithiocarbamate compound, a thiourea compound and a quinoline compound.

4. The rubber composition according to claim 1, wherein the anti-aging agent (C) is represented by the following formula (1) or (2):

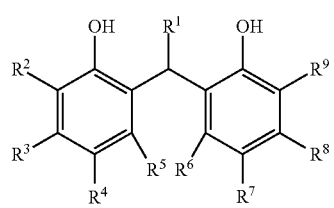

(1)

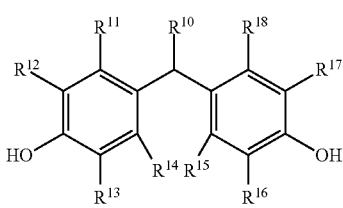

(2)

wherein $R^1$ to $R^9$ and $R^{10}$ to $R^{18}$ each independently represent a hydrogen atom or an alkyl group having 1 to 6 carbon atoms.

5. The rubber composition according to claim 1, wherein the anti-aging agent (C) is represented by the following formula (3):

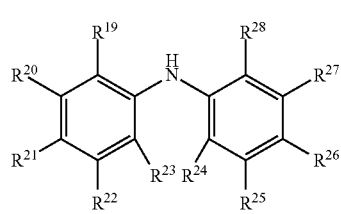

(3)

wherein $R^{19}$, $R^{20}$, and $R^{22}$ to $R^{25}$ each independently represent a hydrogen atom or an alkyl group having 1 to 6 carbon atoms; $R^{21}$ represents a hydrogen atom, an alkyl group having 1 to 10 carbon atoms, an alkenyl group having 1 to 6 carbon atoms, an alkylphenyl group having 9 carbon atoms in total, or a naphthylamino group; $R^{26}$ represents a hydrogen atom, an alkyl group having 1 to 10 carbon atoms, an alkenyl group having 1 to 6 carbon atoms, an alkylphenyl group having 9 carbon atoms in total, a p-toluenesulfonylamino group, a naphthylamino group, an anilino group, or an amino group having an alkyl group having 1 to 8 carbon atoms; $R^{27}$ and $R^{28}$ each independently represent a hydrogen atom, an alkyl group having 1 to 6 carbon atoms, or an alkenyl group having 1 to 6 carbon atoms; $R^{26}$ and $R^{27}$ may bond to each other to form a ring; and $R^{27}$ and $R^{28}$ may bond to each other to form a ring, provided that $R^{26}$ and $R^{27}$ and $R^{28}$ do not form a ring together.

6. The rubber composition according to claim 1, wherein the anti-aging agent (C) is represented by any of the following formulae (4) to (6):

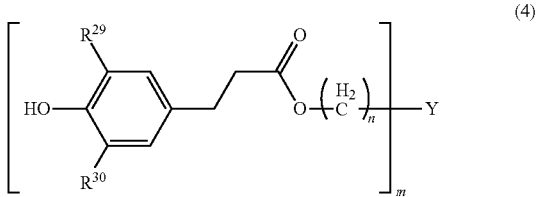
(4)

wherein $R^{29}$ and $R^{30}$ each represent a hydrogen atom or an alkyl group having 1 to 4 carbon atoms;
Y represents a carbon atom, a sulfur atom or an alkyl group having 1 to 20 carbon atoms; m represents an integer of 1 to 4; and n represents an integer of 1 to 3;

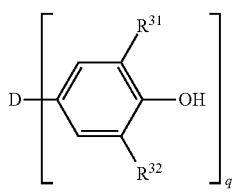
(5)

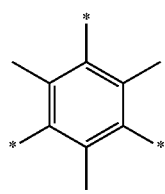
(5a)

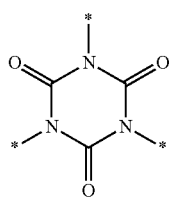
(5b)

wherein $R^{31}$ and $R^{32}$ each represent a hydrogen atom, or an alkyl group having 1 to 4 carbon atoms;
q represents a number of 1 to 3; and D represents a group of (5a) or (5b) where * indicates a bonding site, when q is 1, one bonding site is present, and when q is 3, three bonding sites are present;

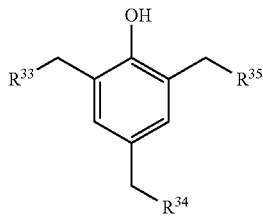
(6)

wherein $R^{33}$, $R^{34}$ and $R^{35}$ each independently represent a hydrogen atom, or a thioether group having an alkyl group having 1 to 20 carbon atoms, provided that a case where $R^{33}$, $R^{34}$ and $R^{35}$ each are a hydrogen atom is excluded.

7. The rubber composition according to claim 1, wherein the anti-aging agent (C) is 2,6-di-tert-butyl-4-methylphenol (BHT).

8. The rubber composition according to claim 1, wherein the anti-aging agent (C) is represented by the following formula (7):

$$P(XR^{36})_{3-q}(XR^{37})_q \quad (7)$$

wherein X represents an oxygen atom or a sulfur atom; $R^{36}$ represents an alkyl group having 1 to 20 carbon atoms, a phenyl group, or a monoalkyl or dialkylphenyl group where the alkyl group has 1 to 12 carbon atoms; $R^{37}$ represents an alkyl group having 8 to 20 carbon atoms; and q represents 0 to 3.

9. The rubber composition according to claim 1, further comprising a filler (D).

10. The rubber composition according to claim 9, wherein the filler (D) is one or more selected from the group consisting of a carbonaceous filler, calcium carbonate, clay, talc, silica, zeolite, diatomaceous earth, alumina, aluminum sulfate, barium sulfate, calcium sulfate, and basic magnesium carbonate.

11. A shoe sole, which is produced by using the rubber composition of claim 1.

12. A method for improving a grip force of a rubber composition, comprising blending
to 100 parts by mass of a rubber composition
1 part by mass to 30 parts by mass of (B) a lignin degradation product having an aldehyde yield, according to an alkaline nitrobenzene oxidation method, of 12% by mass or more, and
0.1 part by mass to 10 parts by mass of (C) an anti-aging agent.

13. The method for improving a grip force of a rubber composition according to claim 12, wherein the weight average molecular weight of the lignin degradation product (B) is 500 or more and 15,000 or less.

14. The method for improving a grip force of a rubber composition according to claim 12, wherein the sulfur content in the lignin degradation product (B) is 0.001% by mass or more and 1% by mass or less.

15. The method for improving a grip force of a rubber composition according to claim 12, wherein the anti-aging agent (C) comprises one or more selected from the group consisting of a bisphenol compound, an aromatic secondary amine compound, a hindered phenol compound, a monophenol compound, a phosphite compound, a polyphenol compound, a benzimidazole compound, a dithiocarbamate compound, a thiourea compound and a quinoline compound.

* * * * *

UNITED STATES PATENT AND TRADEMARK OFFICE
CERTIFICATE OF CORRECTION

Page 1 of 1

PATENT NO. : 11,066,539 B2
APPLICATION NO. : 16/344550
DATED : July 20, 2021
INVENTOR(S) : Koichi Kawamoto It is certified that error appears in the above-identified patent and that said Letters Patent is hereby corrected as shown below:

On the Title Page

Please change:
"(87) PCT Pub. No.: WO2018/079594 PCT Pub. Date: Mar. 5, 2018"
To:
--(87) PCT Pub. No.: WO2018/079594 PCT Pub. Date: May 3, 2018--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*